(12) United States Patent
Biswas et al.

(10) Patent No.: US 9,710,486 B2
(45) Date of Patent: Jul. 18, 2017

(54) DETERMINATION OF A FILTERED MAP INTERACTION DESCRIPTOR

(71) Applicant: Nokia Technologies Oy, Espoo (FI)

(72) Inventors: Debmalya Biswas, Lausanne (SE); Julian Nolan, Pully (SE); Matthew John Lawrenson, Lausanne (SE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/690,143

(22) Filed: Apr. 17, 2015

(65) Prior Publication Data

US 2016/0307041 A1    Oct. 20, 2016

(51) Int. Cl.
*G06K 9/00* (2006.01)
*G06F 17/30* (2006.01)
*G06T 17/05* (2011.01)

(52) U.S. Cl.
CPC ........ *G06F 17/30241* (2013.01); *G06T 17/05* (2013.01)

(58) Field of Classification Search
None
See application file for complete search history.

(56) References Cited

U.S. PATENT DOCUMENTS

| | | | | |
|---|---|---|---|---|
| 5,710,877 A * | 1/1998 | Marimont | ............... | G06T 11/00 345/427 |
| 6,654,800 B1 * | 11/2003 | Rieger, III | ........ | G06F 17/30241 707/E17.018 |
| 7,673,340 B1 * | 3/2010 | Cohen | ................. | G06F 11/3438 379/266.08 |
| 8,103,445 B2 | 1/2012 | Smith et al. | | |
| 8,954,860 B1 * | 2/2015 | Hands | ............... | G06F 17/30873 715/738 |
| 9,147,433 B2 * | 9/2015 | Abecassis | ............... | G11B 27/11 |
| 9,502,031 B2 * | 11/2016 | Paulik | ..................... | G10L 15/22 |
| 2002/0049883 A1 * | 4/2002 | Schneider | ............... | G06F 21/80 711/100 |
| 2002/0112237 A1 * | 8/2002 | Kelts | ..................... | G06F 3/0481 725/39 |

(Continued)

OTHER PUBLICATIONS

Doty et al., "Privacy Issues of the W3c Geolocation API", Feb. 2010.

*Primary Examiner* — Shervin Nakhjavan
(74) *Attorney, Agent, or Firm* — Alston & Bird LLP

(57) ABSTRACT

A method comprising receiving information indicative of a map operation that is associated with a map object, the map operation being invoked by a user, determining a map interaction descriptor that comprises information indicative of the map object, information indicative of the map operation, and information indicative of a map object property, determining a privacy setting that is associated with the map interaction descriptor based on at least a portion of the map interaction descriptor, determining a filtered map interaction descriptor based on the privacy setting and the map interaction descriptor, such that the filtered map interaction descriptor is absent at least a portion of at least one of the information indicative of the map object, the information indicative of the map operation, or the information indicative of the map object property, and causing sending of information indicative of the filtered map interaction descriptor to a separate apparatus is disclosed.

20 Claims, 13 Drawing Sheets

(56) References Cited

U.S. PATENT DOCUMENTS

| | | | |
|---|---|---|---|
| 2006/0271277 A1* | 11/2006 | Hu | G01C 21/3605 |
| | | | 701/533 |
| 2011/0320495 A1 | 12/2011 | Levy-Yurista et al. | |
| 2012/0162225 A1* | 6/2012 | Yang | G06F 17/30241 |
| | | | 345/420 |
| 2012/0166533 A1* | 6/2012 | Rubinstein | G06Q 50/01 |
| | | | 709/204 |
| 2012/0218073 A1* | 8/2012 | Solomon | G06F 21/35 |
| | | | 340/5.8 |
| 2012/0311131 A1 | 12/2012 | Arrasvuori | |
| 2013/0076784 A1* | 3/2013 | Maurer | G01C 21/367 |
| | | | 345/629 |
| 2013/0151666 A1 | 6/2013 | Hunter | |
| 2013/0227017 A1* | 8/2013 | Gahlings | H04L 51/04 |
| | | | 709/204 |
| 2013/0268357 A1 | 10/2013 | Heath | |
| 2013/0325481 A1* | 12/2013 | van Os | G10L 21/00 |
| | | | 704/275 |
| 2014/0095303 A1* | 4/2014 | Jones | G06F 17/30867 |
| | | | 705/14.49 |
| 2014/0157139 A1 | 6/2014 | Coroy | |
| 2014/0195277 A1* | 7/2014 | Kim | G08B 5/221 |
| | | | 705/5 |
| 2014/0244402 A1* | 8/2014 | Binas | G06Q 30/0259 |
| | | | 705/14.69 |
| 2014/0365304 A1* | 12/2014 | Showers | G06Q 30/02 |
| | | | 705/14.55 |
| 2015/0227288 A1* | 8/2015 | Foster | G06F 17/30 |
| | | | 715/771 |

\* cited by examiner

| Map object  400 | Map object property  401 |
|---|---|
| | Map object property  402 |
| | Map object property  403 |
| | ... |
| | Map object property  404 |

| | | | |
|---|---|---|---|
| 412 — | Map object  412A | Map object property  412B | Map operation  412C |
| 414 — | Map object  414A | Map object property  414B | Map operation  414C |
| 416 — | Map object  416A | Map object property  416B | Map operation  416C |
| 418 — | Map object  418A | Map object property  418B | Map operation  418C |

| | | | |
|---|---|---|---|
| 413 — | Map object  413A | Map object property  412B | Map operation  413C |
| 416 — | Map object  416A | Map object property  416B | Map operation  416C |
| 419 — | Map object  419A | Map object property  419B | Map operation  418C |

FIG. 4C

| 430 | | | |
|---|---|---|---|
| 432 — | Map object 412A | Map object property 412B | Map operation 412C | Map operation time 412D |
| 434 — | Map object 414A | Map object property 414B | Map operation 414C | Map operation time 414D |
| 436 — | Map object 416A | Map object property 416B | Map operation 416C | Map operation time 416D |
| 438 — | Map object 418A | Map object property 418B | Map operation 418C | Map operation time 418D |

FIG. 4D

| 440 | | |
|---|---|---|
| 444 — | Map object 414A | Map object property 414B | Map operation 414C |
| 442 — | Map object 412A | Map object property 412B | Map operation 412C |
| 448 — | Map object 418A | Map object property 418B | Map operation 418C |
| 446 — | Map object 416A | Map object property 416B | Map operation 416C |

FIG. 4E

DETERMINATION OF A FILTERED MAP INTERACTION DESCRIPTOR

TECHNICAL FIELD

The present application relates generally to determination of a filtered map interaction descriptor.

BACKGROUND

As electronic apparatuses become increasingly prevalent and pervasive in our society, people increasingly utilize electronic apparatuses to view map information. Many users may utilize electronic apparatuses for purposes relating to viewing map information. Many such users are becoming increasingly aware of issues associated with privacy, data collection, etc. As such, it may be desirable to configure an electronic apparatus such that the electronic apparatus retains at least partial user privacy.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for receiving information indicative of a map operation that is associated with a map object, the map operation being invoked by a user, and the map object being independent of a current location of the user, determining a map interaction descriptor that comprises information indicative of the map object, information indicative of the map operation, and information indicative of at least one map object property, determining a privacy setting that is associated with the map interaction descriptor based, at least in part, on at least a portion of the map interaction descriptor, determining a filtered map interaction descriptor based, at least in part, on the privacy setting and the map interaction descriptor, such that the filtered map interaction descriptor is absent from at least a portion of at least one of the information indicative of the map object, the information indicative of the map operation, or the information indicative of the map object property, and causing sending of information indicative of the filtered map interaction descriptor to a separate apparatus.

One or more example embodiments may provide an apparatus, a computer readable medium, a computer program product, and/or a non-transitory computer readable medium having means for receiving information indicative of a map operation that is associated with a map object, the map operation being invoked by a user, and the map object being independent of a current location of the user, means for determining a map interaction descriptor that comprises information indicative of the map object, information indicative of the map operation, and information indicative of at least one map object property, means for determining a privacy setting that is associated with the map interaction descriptor based, at least in part, on at least a portion of the map interaction descriptor, means for determining a filtered map interaction descriptor based, at least in part, on the privacy setting and the map interaction descriptor, such that the filtered map interaction descriptor is absent from at least a portion of at least one of the information indicative of the map object, the information indicative of the map operation, or the information indicative of the map object property, and means for causing sending of information indicative of the filtered map interaction descriptor to a separate apparatus.

In at least one example embodiment, the map operation is associated with a map operation time that indicates a time at which the map operation was performed.

In at least one example embodiment, the map operation is a map interaction operation that is associated with a representation of map information.

In at least one example embodiment, the map interaction operation is at least one of a zoom operation, a pan operation, a select operation, a tilt operation, or a rotate operation.

In at least one example embodiment, the map operation is a map navigation operation that is associated with a representation of map information.

In at least one example embodiment, the map navigation operation is at least one of a route operation, a search operation, a transportation mode operation, or a route preference operation.

In at least one example embodiment, the map operation is a map settings operation that is associated with a representation of map information.

In at least one example embodiment, the map navigation operation is at least one of a scale operation or an overlay operation.

In at least one example embodiment, the map object is associated with at least one of a street, an intersection, an address, a set of geographical coordinates, a building, a suite, a point of interest, a retailer, a restaurant, or a public transportation node.

One or more example embodiments further perform receipt of information that identifies the map object.

In at least one example embodiment, the information that identifies the map object is at least one of a location of the map object or a unique identifier that identifies the map object.

In at least one example embodiment, the receipt of information that identifies the map object comprises receipt of information indicative of a map object identification input that identifies the map object.

One or more example embodiments further perform identification of the map object based, at least in part, on the map operation.

In at least one example embodiment, the identification of the map object comprises determination that the map operation is associated with the map object.

In at least one example embodiment, the identification of the map object comprises determination of a correlation between the map operation and the map object.

In at least one example embodiment, the determination of the correlation between the map operation and the map object is based, at least in part, on one or more inferences drawn from the map operation.

In at least one example embodiment, the determination of the correlation between the map operation and the map object is based, at least in part, on one or more of a map operation heat map, a display position of at least a portion of a representation of map information, a map operation time associated with the map operation, or gaze tracking information that is indicative of the map object.

In at least one example embodiment, the determination that the map operation is associated with the map object comprises determination that the map object is focal to the map operation.

In at least one example embodiment, the map object property identifies a property associated with the map object.

In at least one example embodiment, the privacy setting indicates a level of privacy associated with at least one of a map object or a map object property.

In at least one example embodiment, the determination of the privacy setting comprises receipt of information indicative of the privacy setting based, at least in part, on the map interaction descriptor.

One or more example embodiments further perform sending of information indicative of the map interaction descriptor to another separate apparatus based, at least in part, on the determination of the map interaction descriptor, wherein the determination of the privacy setting that is associated with the map interaction descriptor comprises receipt of information indicative of the privacy setting from the other separate apparatus based, at least in part, on the sending of the information indicative of the map interaction descriptor to the other separate apparatus.

In at least one example embodiment, the information indicative of the privacy setting is received from at least one of a memory or a separate apparatus.

One or more example embodiments further perform causation of display of a privacy setting user interface element based, at least in part, on the determination of the map interaction descriptor, wherein the receipt of information indicative of the privacy setting comprises receipt of information indicative of a privacy setting indication input that indicates a privacy setting that is associated with the map interaction descriptor.

In at least one example embodiment, the map interaction descriptor is comprised by a map interaction session descriptor that comprises at least one other map interaction descriptor.

In at least one example embodiment, the determination of the privacy setting that is associated with the map interaction descriptor comprises determination of a privacy setting that is associated with the map interaction session descriptor based, at least in part, on at least a portion of the map interaction session descriptor.

In at least one example embodiment, the determination of the filtered map interaction descriptor comprises determination of a filtered map interaction session descriptor based, at least in part, on the privacy setting and the map interaction session descriptor.

In at least one example embodiment, the causation of sending of information indicative of the filtered map interaction descriptor comprises causation of sending of information indicative of the filtered map interaction session descriptor to the separate apparatus.

In at least one example embodiment, the determination of the filtered map interaction descriptor comprises modification of the map interaction descriptor such that at least a portion of the map interaction descriptor is generalized.

In at least one example embodiment, the determination of the filtered map interaction descriptor comprises causation of modification of the map interaction descriptor based, at least in part, on the privacy setting, such that at least a portion of at least one of the information indicative of the map object, the information indicative of the map operation, or the information indicative of the map object property is generalized.

In at least one example embodiment, the modification of the map interaction descriptor such that the portion of the map interaction descriptor is generalized is based, at least in part, on a level of privacy indicated by the privacy setting.

In at least one example embodiment, the modification of the map interaction descriptor such that the portion of the map interaction descriptor is generalized is proportional to a level of privacy indicated by the privacy setting.

In at least one example embodiment, the determination of the filtered map interaction descriptor is performed such that the filtered map interaction descriptor conveys less information associated with the map object than the map interaction descriptor.

In at least one example embodiment, the determination of the filtered map interaction descriptor comprises modification of the map interaction session descriptor such that the map interaction session descriptor corresponds with at least one user historical map interaction session descriptor that comprises at least one user historical map interaction descriptor.

In at least one example embodiment, the user historical map interaction descriptor is a historical map interaction descriptor that is associated with the user, and the user historical map interaction session descriptor is a historical map interaction session descriptor that is associated with the user.

In at least one example embodiment, the modification of the map interaction session descriptor is based, at least in part, on a level of privacy indicated by the privacy setting.

In at least one example embodiment, the modification of the map interaction session descriptor is proportional to a level of privacy indicated by the privacy setting.

One or more example embodiments further perform determination that the map interaction session descriptor at least partially corresponds with at least one historical map interaction session descriptor, wherein the determination of the filtered map interaction descriptor comprises determination of the filtered map interaction descriptor based, at least in part, on the privacy setting, the map interaction session descriptor, and the historical map interaction session descriptor, such that the filtered map interaction descriptor at least partially corresponds with at least one historical map interaction descriptor of the historical map interaction session descriptor.

In at least one example embodiment, the historical map interaction session descriptor is a user historical map interaction session descriptor.

In at least one example embodiment, the historical map interaction session descriptor is a cross-user historical map interaction session descriptor.

In at least one example embodiment, the determination of the filtered map interaction descriptor comprises modification of the map interaction session descriptor such that the map interaction session descriptor corresponds with at least one cross-user historical map interaction session descriptor that comprises at least one cross-user historical map interaction descriptor.

In at least one example embodiment, the cross-user historical map interaction descriptor is a historical map interaction descriptor that fails to be associated with the user, and the cross-user historical map interaction session descriptor is a historical map interaction session descriptor that fails to be associated with the user.

In at least one example embodiment, the modification of the map interaction session descriptor is based, at least in part, on a level of privacy indicated by the privacy setting.

In at least one example embodiment, the modification of the map interaction session descriptor is proportional to a level of privacy indicated by the privacy setting.

In at least one example embodiment, the map interaction session descriptor comprises information indicative of a chronological sequence of the map interaction descriptor and the other map interaction descriptor.

In at least one example embodiment, the information indicative of the chronological sequence of the map interaction descriptor and the other map interaction descriptor is information indicative of a time associated with the map interaction descriptor and information indicative of another time associated with the other map interaction descriptor.

In at least one example embodiment, the determination of the filtered map interaction descriptor comprises modification of the map interaction session descriptor such that the map interaction session descriptor fails to comprise the information indicative of the time associated with the map interaction descriptor and information indicative of the other time associated with the other map interaction descriptor.

In at least one example embodiment, the information indicative of the chronological sequence of the map interaction descriptor and the other map interaction descriptor is an order of the map interaction descriptor and the other map interaction descriptor in the map interaction session descriptor.

In at least one example embodiment, the determination of the filtered map interaction descriptor comprises modification of the map interaction session descriptor such that the order of the map interaction descriptor and the other map interaction descriptor in the map interaction session descriptor fails to be indicative of the chronological sequence of the map interaction descriptor and the other map interaction descriptor.

In at least one example embodiment, the determination of the filtered map interaction descriptor comprises modification of the map interaction session descriptor such that the map interaction session descriptor fails to comprise the information indicative of the chronological sequence of the map interaction descriptor and the other map interaction descriptor.

One or more example embodiments further perform determination of a user uniqueness of the map interaction session descriptor based, at least in part, on the map interaction session descriptor and a plurality of user historical map interaction session descriptors, wherein the determination of the filtered map interaction descriptor is based, at least in part, on the user uniqueness of the map interaction session.

One or more example embodiments further perform determination of a non-user uniqueness of the map interaction session descriptor based, at least in part, on the map interaction session descriptor and a plurality of cross-user historical map interaction session descriptors, wherein the determination of the filtered map interaction descriptor is based, at least in part, on the non-user uniqueness of the map interaction session.

One or more example embodiments further perform determination of a user sequence uniqueness of the map interaction session descriptor based, at least in part, on the map interaction session descriptor and a plurality of user historical map interaction session descriptors, wherein the determination of the filtered map interaction descriptor is based, at least in part, on the user sequence uniqueness of the map interaction session.

One or more example embodiments further perform determination of a non-user sequence uniqueness of the map interaction session descriptor based, at least in part, on the map interaction session descriptor and a plurality of cross-user historical map interaction session descriptors, wherein the determination of the filtered map interaction descriptor is based, at least in part, on the non-user sequence uniqueness of the map interaction session.

In at least one example embodiment, the other map interaction descriptor comprises information indicative of another map object, information indicative of another map operation, and information indicative of at least another map object property.

One or more example embodiments further perform determination of another privacy setting that is associated with the other map interaction descriptor based, at least in part, on at least a portion of the other map interaction descriptor, and causation of deletion of the other map interaction descriptor based, at least in part, on the other privacy setting.

One or more example embodiments further perform causation of display of a representation of map information that comprises a representation of the map object.

In at least one example embodiment, the receipt of information indicative of the map operation comprises receipt of information indicative of a map operation input that is indicative the map operation.

BRIEF DESCRIPTION OF THE DRAWINGS

For a more complete understanding of one or more example embodiments, reference is now made to the following descriptions taken in connection with the accompanying drawings in which:

FIGS. 4A-4E are diagrams illustrating data associations according to at least one example embodiment;

DETAILED DESCRIPTION OF THE DRAWINGS

Figure 1:
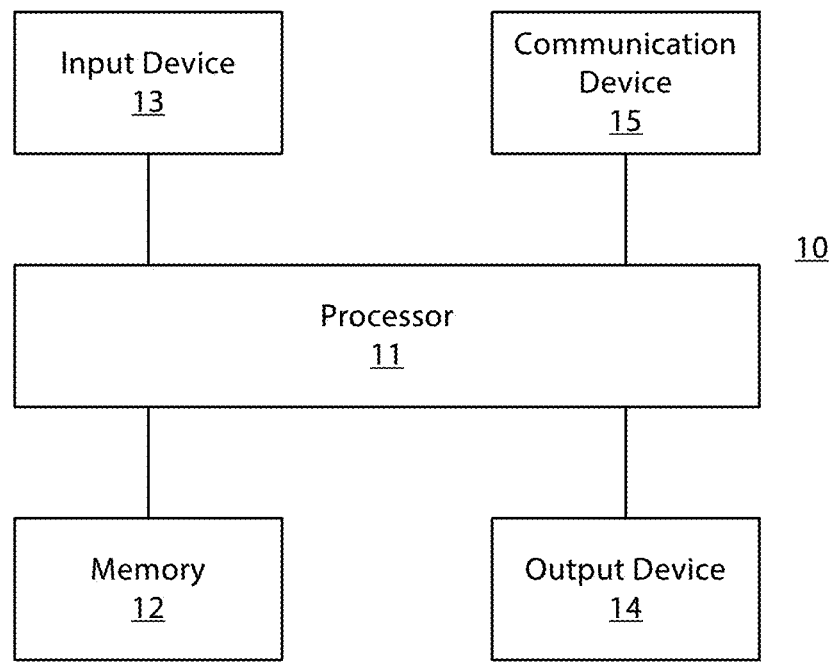
FIG. 1 is a block diagram showing an apparatus according to at least one example embodiment.

Various example embodiments and some of their potential advantages are understood by referring to FIGS. 1 through 9 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

Figure 2:
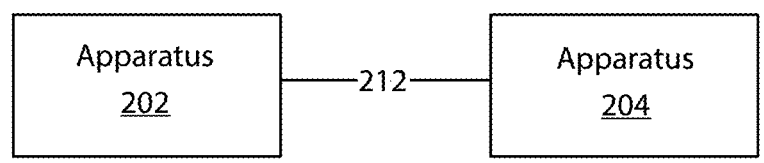
FIG. 2 is a diagram illustrating apparatus communication according to at least one example embodiment.

FIG. 2 is a diagram illustrating apparatus communication according to at least one example embodiment. The example of FIG. 2 is merely an example and does not limit the scope of the claims. For example, apparatus count may vary, apparatus configuration may vary, communication channels may vary, and/or the like.

In the example of FIG. 2, apparatus 202 is an electronic apparatus. An electronic apparatus may be an electronic apparatus that a user commonly utilizes during performance of various tasks, activities, and/or the like. For example, apparatus 202 may be an electronic apparatus that the user frequently utilizes to view map information, to browse map information, to search for points of interests, to provide routing information which may be used to travel to a particular destination, etc. For example, the electronic apparatus may be a phone, a tablet, a computer, a laptop, a near eye apparatus, and/or the like. In the example of FIG. 2, apparatus 204 is a separate apparatus, such as a separate electronic apparatus. For example, separate electronic apparatus may be used collaboratively with the electronic apparatus, in conjunction with the apparatus, in addition to the electronic apparatus, such that the separate apparatus is supporting one or more services associated with the electronic apparatus, and/or the like. In another example, the separate electronic apparatus may be utilized to store information associated with the electronic apparatus, to process information received from the electronic apparatus, and/or the like. For example, a separate electronic apparatus may be a phone, a tablet, a computer, a laptop, a server, a database, a cloud platform, a near eye apparatus, and/or the like. Although the aforementioned example describes apparatus 202 and apparatus 204 as distinct types of apparatuses, namely, an electronic apparatus and a separate electronic apparatus, in some circumstances, the apparatuses may both be electronic apparatuses, both be separate electronic apparatuses, and/or the like.

In the example of FIG. 2, apparatus 202 communicates with apparatus 204 by way of communication channel 212. For example, apparatus 202 may send information to apparatus 204 by way of communication channel 212, apparatus 202 may receive information sent from apparatus 204 by way of communication channel 212, and/or the like. A communication channel, for example, may be a channel utilized for sending and/or receiving of information, data, communications, and/or the like, between two or more apparatuses. It should be understood that, even though the example of FIG. 2 illustrates a direct communication channel between apparatus 202 and apparatus 204, there may be intermediate apparatuses that facilitate communication between apparatus 202 and apparatus 204. For example, there may be one or more routers, hubs, switches, gateways, and/or the like, that are utilized in the communication channels between apparatus 202 and apparatus 204. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, an apparatus may be a phone, a tablet, a computer, a display, a monitor, a head mounted display, a see through display, a wearable apparatus, a head worn apparatus, a hand worn apparatus, an electronic apparatus, a peripheral apparatus, a host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2, apparatus 202 communicates with apparatus 204 by way of a communication channel 212. In the example of FIG. 2, communication channel 212 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2, apparatus 202 communicates with apparatus 204 by way of communication channel 212. In the example of FIG. 2, communication channel 212 may be a local area network communication channel, a wide area network communication channel, an internet communication channel, a cellular communication channel, and/or the like.

FIGS. 3A-3E are diagrams illustrating a representation of map information according to at least one example embodiment. The examples of FIGS. 3A-3E are merely examples and do not limit the scope of the claims. For example, map information may vary, representation of the map information may vary, map operations may vary, map objects may vary, representation of the map objects may vary, and/or the like.

In many circumstances, a user may interact with one or more mapping programs, such as a navigation program, a visual mapping application, a map-related services application, a location-based recommendation application, and/or the like. Such programs may provide particular mapping-oriented features to a user of the program. For example, the user may utilize such programs to plan an outing to a park, to see what restaurants are close to a particular location, to visually navigate various potential routes between the park and a particular restaurant, and/or the like. For example, a mapping program may offer navigation features, routing information, mapping information, recommendations, notifications, advertising, and/or the like. Such mapping programs may cause display of a representation of map information that the user may interact with, manipulate, search, pan, and/or the like.

As such, in many circumstances, the map information comprises information indicative of one or more map objects. A map object may be any element or feature comprised by the map information. For example, a map object may be associated with, indicative of, representative of, etc. at least one of a map element, a map feature, a park, a postal code, a city, a state, a street, a highway, an intersection, an address, a set of geographical coordinates, a building, a suite, a point of interest, a retailer, a restaurant, a public transportation node, and/or the like. In such an example, a mapping program may cause display of a representation of a map object relative to the representation of the map information. Such a representation may be textual, graphical, and/or the like. For example, the map object may be associated with a restaurant, and the representation of the restaurant may be a graphical representation of a restaurant symbol, may be a textual representation of the name of the restaurant, and/or the like. In another example, the map object may be a highway, and the representation of the highway may be a graphical representation of a highway sign, may be a textual representation of the name of the highway, and/or the like.

Figure 3A:
FIGS. 3A-3E are diagrams illustrating a representation of map information according to at least one example embodiment.

FIG. 3A is a diagram illustrating a representation of map information according to at least one example embodiment. The example of FIG. 3A depicts map information 300, which is a representation of map information associated with the city of San Francisco, Calif. As can be seen, map information 300 comprises representations of numerous map objects. For example, various highways, streets, islands, parks, neighborhoods, and/or the like are represented in map information 300 by way of various graphical representations, textual representations, and/or the like. In the example of FIG. 3A, a user may view at least a portion of map information 300 by way of an apparatus, such as an electronic apparatus. In such an example, the user may zoom in on particular portions of map information 300, may pan across map information 300, may rotate and/or tilt map information 300, and/or the like.

As discussed previously, in many circumstances, a user may desire to interact with map information by way of a mapping program. For example, the user may desire to view a representation of the map information, to zoom in on a portion of the representation of the map information, to pan across the map information, etc. In many circumstances, the user may desire to interact with the map information such that the user may perceive a particular map object, may discover points of interest along a particular street or a particular route, and/or the like. In such circumstances, the user's interactions with the map information may be in relation to one or more map objects comprised by the map information. For example, the user may zoom in on a particular portion of the map information in order to get a closer look at a particular building, the user may pan across a particular portion of the map information in order to perceive the layout of a particular street, and/or the like. As such, the map object may be independent of a current location of a user, independent of a current location of an apparatus, such as an electronic apparatus, and/or the like.

Figure 3B:
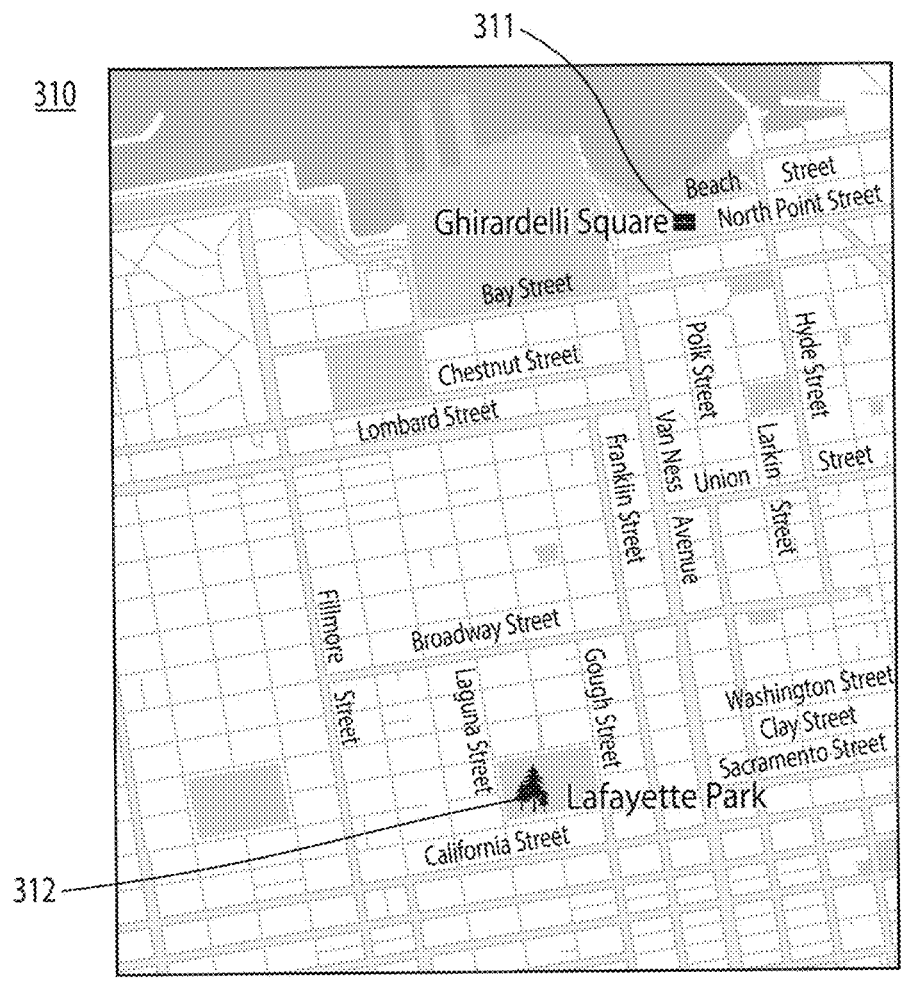

FIG. 3B is a diagram illustrating a representation of map information according to at least one example embodiment. The example of FIG. 3B depicts map information 310, which is a representation of map information associated with the city of San Francisco, Calif. As can be seen, map information 310 comprises representations of numerous map objects, including map object 311 and map object 312. Each of map objects 311 and 312 are representations of map objects. For example, various highways, streets, islands, parks, neighborhoods, and/or the like are represented in map information 310 by way of various graphical representations, textual representations, and/or the like. For example, map object 311 is associated with "Ghirardelli Square," and map object 312 is associated with "Lafayette Park." In the example of FIG. 3B, a user may view at least a portion of map information 310 by way of an apparatus, such as an electronic apparatus. In such an example, the user may zoom in on particular portions of map information 310, may pan across map information 310, may rotate and/or tilt map information 310, and/or the like.

As can be seen, map information 310 is a zoomed in version of a portion of map information 300 from FIG. 3A. Specifically, map information 310 is a zoomed in version of the north-central portion of the San Francisco peninsula. In this manner, a user may have viewed map information 300 by way of the user's apparatus, and performed a zoom map operation at a position relative to the north-central portion of the San Francisco peninsula that resulted in map information 310 being displayed on the user's apparatus.

As discussed previously, in many circumstances, a user may be primarily interested in viewing particular map objects, exploring map information that is proximate to a particular map object, and/or the like. As such, it may be desirable to configure an apparatus such that the apparatus may identify the particular map object with which the user desires to interact with. In at least one example embodiment, an apparatus receives information indicative of a map operation that is associated with a map object. For example, the apparatus may receive information indicative of a map operation input that is indicative of a particular map operation. In such an example, the map operation may be invoked by a user by way of the map operation input. In at least one example embodiment, the map operation is a map interaction operation. The map interaction operation may, for example, be associated with map information, a map object, a representation of map information, a representation of a map object, and/or the like. For example, the map interaction operation may be a zoom operation, a pan operation, a select operation, a tilt operation, a rotate operation, and/or the like. In at least one example embodiment, the map operation is a map navigation operation. The map navigation operation may, for example, be associated with map information, a map object, a representation of map information, a representation of a map object, and/or the like. For example, the map navigation operation may be a route operation, a search operation, a transportation mode operation, a route preference operation, and/or the like. For example, the map navigation operation may indicate a desire to determine a route based, at least in part, on avoiding toll roads, following cycling pathways, utilizing public transportation, optimizing a route for walking, and/or the like. In at least one example embodiment, the map operation is a map settings operation. The map settings operation may, for example, be associated with map information, a map object, a representation of map information, a representation of a map object, and/or the like. For example, the map settings operation may be a scale adjustment operation, an overlay operation, and/or the like. For example, the map settings operation may indicate a desire to cause display of a traffic overlay, to display satellite imagery, to display a standard map view, to display a weather overlay, to modify the type of map objects represented in the representation of map information, and/or the like.

In some circumstances, in order to facilitate the providing of various map information and/or information associated with various map objects to a user, it may be desirable to identify one or more specific map objects that a user may interact with, that the user may be interested in, and/or the like. As such, it may be desirable to configure an apparatus such that the apparatus may identify a particular map object associated with a map operation. In at least one example embodiment, an apparatus receives information that identifies a map object. In such an example embodiment, the information that identifies the map object may be a location of the map object, an address of the map object, a set of geographical coordinates of the map object, a unique identifier that identifies the map object, and/or the like. In this manner, the apparatus may be able to uniquely identify a particular map object out of a plurality of map objects. The information that identifies the map object may be received from memory, may be received from a separate apparatus, and/or the like. In some circumstances, a user may specifically identify a particular map object by way of a map operation that identifies the map object. In such circumstances, the apparatus may receive information indicative of the map operation that identifies the map object.

As discussed previously, in many circumstances, a user may be primarily interested in viewing particular map objects, exploring map information that is proximate to a particular map object, viewing various routes which may connect a map object to another map object, and/or the like. In such circumstances, the user may fail to explicitly identify a particular map object and may, instead, perform various map operations surrounding the particular map object. For example, the user may pan around an area of a representation of map information to which the map object is central, may zoom in to a high level of zoom on the map object, may pan across a portion of the map information in a path that follows the path of a road, and/or the like. As such, it may be desirable to configure an apparatus such that the apparatus may identify the particular map object with which the user desires to interact with based, at least in part, on a map operation.

In at least one example embodiment, an apparatus identifies a map object based, at least in part, on a map operation. In such an example embodiment, the identification of the map object may comprise determination that the map operation is associated with the map object. For example, the apparatus may determine a correlation between the map operation and the map object. Such a correlation between the map operation and the map object may be based, at least in part, on one or more inferences drawn from the map operation. For example, the determination of the correlation between the map operation and the map object may be based, at least in part, on a map operation heat map, a display position of at least a portion of a representation of map information, a map operation time associated with the map operation, gaze tracking information that is indicative of the map object, determination that the map object is focal to the map operation, and/or the like. For example, a map operation heat map may be generated such that the map operation heat map identifies a duration that a particular portion of map information or a particular map object has been viewed, a number of map operations associated with portions of the map information or centered upon a particular map object, and/or the like. Such a map operation heat map may be based, at least in part, on a level of zoom associated with a portion of map information, a number of panning operations across a particular map object, a duration of time during which a portion of map information has been displayed on a user's apparatus, and/or the like.

In some circumstances, it may be desirable to keep a record of various interactions that a user may have with map information, map objects, etc. For example, the user may desire to view previously viewed map objects, the user may desire to perceive a route comprised by a portion of map information that the user previously panned across, and/or the like. In order to facilitate such interactions, it may be desirable to configure an apparatus such that the apparatus causes storage of various information indicative of a user's interactions with map information, with various map objects, and/or the like. In at least one example embodiment, an apparatus determines a map interaction descriptor. In such an example embodiment, the map interaction descriptor may comprise information indicative of the map object, information indicative of the map operation, information indicative of at least one map object property of the map object, and/or the like. In such an example embodiment, the map object property may identify a property associated with the map object, characterize the map object by type, provide supplemental information associated with the map object, and/or the like. For example, a map object property may be a type of the map object, such as a restaurant, a tire shop, etc., a name of the map object, a location of the map object, such as an address, a set of geographical coordinates, etc., other metadata associated with the map object, such as a menu, hours of operation, etc., activities performed at the location indicated by the map object, such as sleeping, dancing, eating, shopping, etc., services performed at the location indicated by the map object, such as shoe repair, tire repair, etc., and/or the like.

Figure 3C:
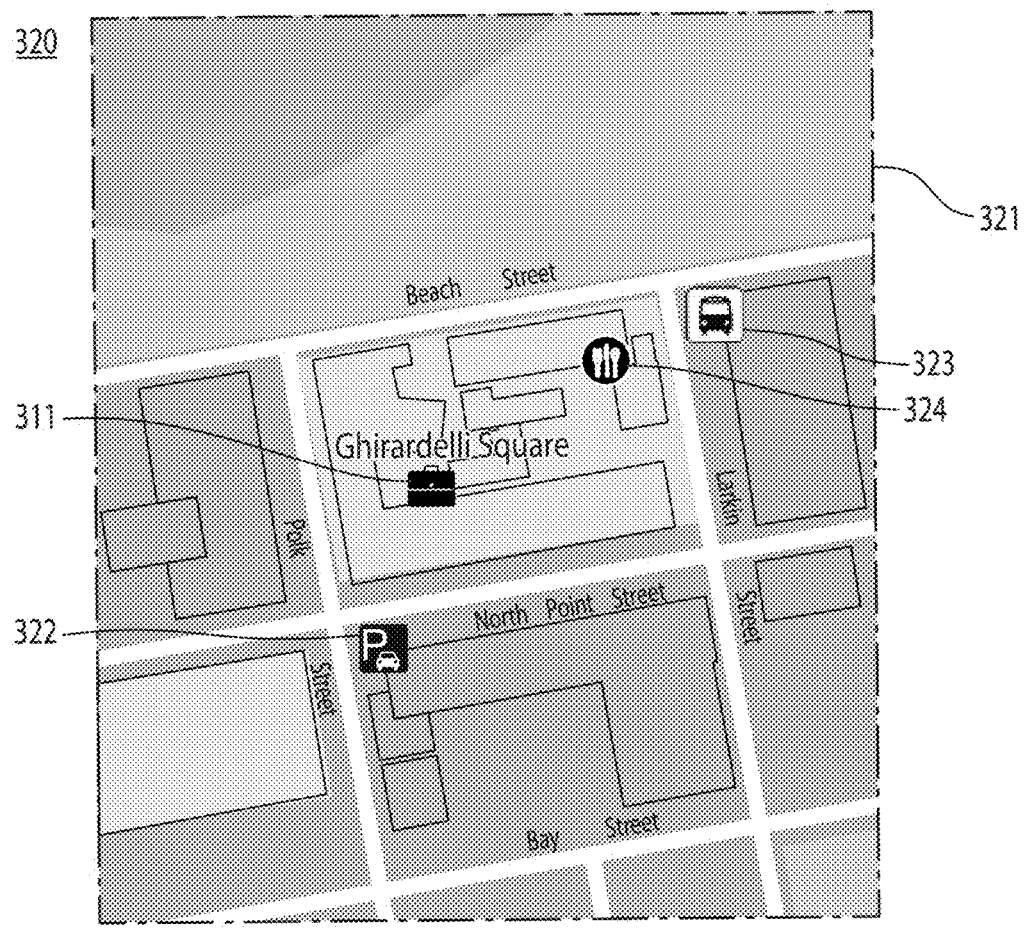

FIG. 3C is a diagram illustrating user interaction with a representation of map information according to at least one example embodiment. The example of FIG. 3C depicts map information 320, which is a representation of map information associated with the city of San Francisco, Calif. and, more specifically, associated with a region of San Francisco proximate to "Ghirardelli Square." As can be seen, map information 320 comprises representations of numerous map objects, including map objects 311, 322, 323, and 324. Each of map objects 311, 322, 323, and 324 are representations of map objects. Additionally, various highways, streets, islands, parks, neighborhoods, and/or the like are represented in map information 320 by way of various graphical representations, textual representations, and/or the like. As can be seen, map object 311, which is associated with "Ghirardelli Square," corresponds with map object 311 of FIG. 3B. In this manner, map information 320 may be a zoomed in version of a portion of map information 300 from FIG. 3A, may be a zoomed in version of a portion of map information 310 from FIG. 3B, and/or the like. Specifically, in the example of FIG. 3C, map information 320 is a zoomed in version of a north-north-eastern portion of the San Francisco peninsula. In this manner, a user may have viewed map information 300 by way of the user's apparatus, and performed a zoom map operation at a position relative to the north-north-eastern portion of the San Francisco peninsula that resulted in map information 320 being displayed on the user's apparatus. Similarly, a user may have viewed map information 310 by way of the user's apparatus, and performed a zoom map operation at a position relative to the north-north-eastern portion of the San Francisco peninsula that resulted in map information 320 being displayed on the user's apparatus.

In the example of FIG. 3C, a user may view at least a portion of map information 320 by way of an apparatus, such as an electronic apparatus. In such an example, the user may zoom in on particular portions of map information 320, may pan across map information 320, may rotate and/or tilt map information 320, and/or the like. As can be seen, it may be inferred from map information 320 that the user of the electronic apparatus desires to view information associated with map object 311. For example, display region 321 of map information 320 may be a portion of map information 320 that is displayed on a user's apparatus. As can be seen, map object 311 is central to display region 321. Although display region 321 includes additional map objects, such as map objects 322, 323, and 324, it may be inferred that the user is focusing on map object 311 based, at least in part, on a zoom operation centered upon map object 311, a panning operation that resulted in map object 311 being moved to the center of display region 321, and/or the like. In this manner, an apparatus may determine a map interaction descriptor that comprises information indicative of map object 311, information indicative of at least one map object property associated with map object 311, information indicative of a map operation performed with respect to map object 311, and/or the like. For example, the map interaction descriptor may comprise information that identifies "Ghirardelli Square," information that indicates that "Ghirardelli Square" is a shopping center with various restaurants and outdoor eating space, and information that indicates that a user zoomed in on "Ghirardelli Square" from the level of zoom of map information 310 depicted in FIG. 3B such that display region 321 of map information 320 was displayed on the user's apparatus.

Figure 3D:
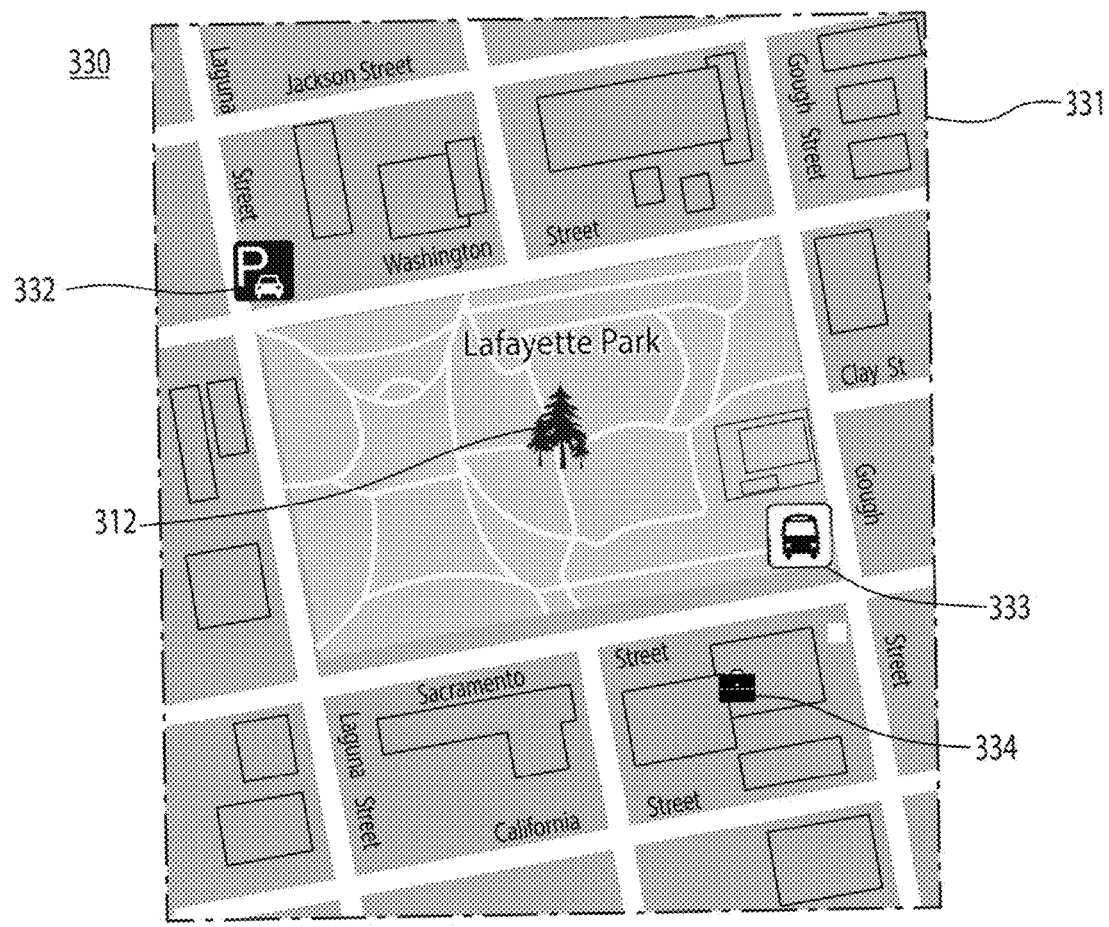

FIG. 3D is a diagram illustrating user interaction with a representation of map information according to at least one example embodiment. The example of FIG. 3D depicts map information 330, which is a representation of map information associated with the city of San Francisco, Calif. and, more specifically, associated with a region of San Francisco proximate to "Lafayette Park." As can be seen, map information 330 comprises representations of numerous map objects, including map objects 312, 332, 333, and 334. Each of map objects 312, 332, 333, and 334 are representations of map objects. Additionally, various highways, streets, islands, parks, neighborhoods, and/or the like are represented in map information 330 by way of various graphical representations, textual representations, and/or the like. As can be seen, map object 312, which is associated with "Lafayette Park," corresponds with map object 312 of FIG. 3B. In this manner, map information 330 may be a zoomed in version of a portion of map information 300 from FIG. 3A, may be a zoomed in version of a portion of map information 310 from FIG. 3B, and/or the like. Specifically, in the example of FIG. 3D, map information 330 is a zoomed in version of a north-north-eastern portion of the San Francisco peninsula. In this manner, a user may have viewed map information 300 of FIG. 3A by way of the user's apparatus, and performed a zoom map operation at a position relative to a north-north-eastern portion of the San Francisco peninsula that resulted in map information 330 being displayed by way of the user's apparatus. Similarly, a user may have viewed map information 310 of FIG. 3B by way of the user's apparatus, and performed a zoom map operation at a position relative to a north-north-eastern portion of the San Francisco peninsula that resulted in map information 330 being displayed by way of the user's apparatus. In another example, the user may have viewed map information 320 of FIG. 3C by way of the user's apparatus, and performed a pan map operation in a south-south-western direction that resulted in display portion 331 of map information 330 being displayed by way of the user's apparatus.

In the example of FIG. 3D, it may be inferred from map information 330 that the user of the electronic apparatus desires to view information associated with map object 312. For example, similar as discussed previously, display region 331 of map information 330 may be a portion of map information 330 that is displayed on a user's apparatus. As can be seen, map object 312 is central to display region 331. Although display region 331 includes additional map objects, such as map objects 332, 333, and 334, it may be inferred that the user is interested in map object 312 based, at least in part, on a zoom operation centered upon map object 312, a panning operation that resulted in map object 312 being moved to the center of display region 331, and/or the like. In this manner, an apparatus may determine a map interaction descriptor that comprises information indicative of map object 312, information indicative of at least one map object property associated with map object 312, information indicative of a map operation performed with respect to map object 312, and/or the like. For example, the map interaction descriptor may comprise information that identifies "Lafayette Park," information that indicates that "Lafayette Park" is a public park with a playground and a walking path, and information that indicates that a user panned the representation of the map information from display region 321 of FIG. 3C to display region 331 of FIG. 3D such that "Lafayette Park" was centered in the display region of the user's apparatus.

In recent times, mapping programs have become increasingly sophisticated. For example, mapping programs may utilize specialized maps, such as multi-view maps, that allow a user to view a map in various modes. For example, the user may switch from a "tourist" mode to an "explorer" mode. Such modes may affect the set of map objects, and their corresponding map object properties, that are displayed to the user. Additionally, a timeline view may allow user to view a chronologically sorted view of all map objects viewed by the user, interacted with by the user, identified by way of one or more map operations associated with the map objects, and/or the like. In another example, a mapping program may utilize multi-dimensional maps that allow for the characterizing of a point of interest indicated by a map object, capturing of pictures and/or videos of locations associated with map objects, other sensory aspects associated with the map objects, such as noise, smell, etc., and/or the like. The widespread adoption of such feature rich mapping programs has led to users spending more and more time interacting with them. While location privacy solutions have primarily focused on restricting the sharing of real-time location, the user's interactions within a mapping program can have similarly sensitive privacy implications. For example, as described previously, various map interaction descriptors that identify particular map objects that a user is interested in may be determined without a user explicitly identifying the map objects. Instead, the map objects may be determined based, at least in part, on various map operations performed by the user, the manner in which the user interacts with the map information, and/or the like.

As such, even if a user is using a mapping program in an "anonymous mode", or interacting with the mapping program with location sharing functionality disabled, it may be possible to extract sufficient distinguishing features from the user's mapping program interaction data, such as a set of map interaction descriptors, to uniquely identify the user. Such a result may be achieved by co-relating map interaction descriptors over multiple sessions where the user, for example, views specific types of map objects at a certain zoom level, follows a similar sequence of actions while exploring new locations, and/or the like. For example, when a user queries for a particular map object in a mapping program, the user's interest in the specific location indicated by the map object is evident since the user explicitly searched for the particular map object. However, a map interaction session descriptor, which comprises a plurality of map interaction descriptors, may also be analyzed to infer additional location sensitive information regarding the user. For example, from the map interaction session descriptor, it may be possible to infer when the user is likely to undertake travel, the specific map objects, e.g. shops, buildings, establishments, etc. of interest to the user at the user's destination, the user's mode of transport for an itinerary, e.g. if the user spends more time exploring the parking arrangement at a location or the nearby bus stops, and/or the like. In some circumstances, it may be possible to infer information that is even more personal to the user. For example, the user's eye health, such as vision accuracy and/or clarity, may be inferred based, at least in part, on a distance between the eye of the user and the user's apparatus, an angle at which the user prefers to view certain types of map objects, browsing map information at a high level of zoom, and/or the like.

As such, it may be desirable to quantify one or more privacy risks posed by a map interaction session descriptor associated with a user, and to implement privacy preserving approaches for the map interaction session descriptor accordingly. In order to facilitate such implementation of privacy preserving approaches, it may be desirable to identify relevant map objects, as discussed previously. For example, as the user interacts with and/or manipulates map information by way of a mapping program, an apparatus may continually supplement the map interaction session descriptor such that the map interaction session descriptor is dynamically updated with map interaction descriptors that are indicative of the user's interactions and/or manipulations of the map information.

For example, for map object o, map operation a, and map object properties p, a map interaction descriptor O may be represented by:

$$O=\{(o_{s1},a_{s1},p_{s1})\}$$

Similarly, for map object o, map operation a, and map object properties p, a plurality of map interaction descriptors comprised by map interaction session descriptor $O_s$ may be represented by:

$$O_s=\{(o_{s1},a_{s1},p_{s1}),(o_{s2},a_{s2},p_{s2}), \ldots ,(o_{sn},a_{sn},p_{sn})\}$$

In order to facilitate implementation of various privacy preserving approaches associated with a user's interactions with a mapping program, it may be desirable to quantify a user's sensitivity to various map objects, map operations, sequences of map operations, and/or the like. For example, a user may be expected to have different privacy sensitivity to different map objects, different map operations, different sequences of map operations, and/or the like. Additionally, in some circumstances, this sensitivity may be context dependent, time dependent, and/or the like. For instance, revealing a map interaction session descriptor that comprises information that indicates that a user was exploring 'hospital' map objects might be more privacy sensitive for the user than revealing that the user was interacting with various 'restaurant' map objects by way of the user's mapping program. However, in some circumstances, even 'hospital' map objects might have a low privacy sensitivity for the user if the user is planning a trip to the hospital for a regular check-up, and not for treatment of a newly contracted illness.

As such, it may be desirable to configure an apparatus such that the apparatus may determine a privacy setting associated with a map interaction descriptor, associated with a map interaction session descriptor, and/or the like. In at least one example embodiment, an apparatus determines a privacy setting that is associated with a map interaction descriptor based, at least in part, on at least a portion of the map interaction descriptor. For example, the determination of the privacy setting may be based, at least in part, on the map object indicated by the map interaction descriptor, on one or more map object properties associated with the map object and indicated by the map interaction descriptor, and/or the like. In such an example embodiment, the privacy setting may indicate a level of privacy associated with a map object, a map object property, a sequence of map operations, a sequence of map operations associated with a plurality of map objects, and/or the like. In at least one example embodiment, determination of the privacy setting that is associated with a map interaction descriptor comprises determination of a privacy setting that is associated with a map interaction session descriptor that comprises the map interaction descriptor based, at least in part, on at least a portion of the map interaction session descriptor. The portion of the map interaction session descriptor may, for example, be the map interaction descriptor, a plurality of map interaction descriptors comprised by the map interaction session descriptor, a portion of a map interaction descriptor comprised by the map interaction session descriptor, and/or the like.

In at least one example embodiment, the determination of the privacy setting comprises receipt of information indicative of the privacy setting based, at least in part, on the map interaction descriptor, the map interaction session descriptor, and/or the like. The information indicative of the privacy setting may, for example, be received from memory, from a separate apparatus, and/or the like. For instance, the apparatus may cause sending of information indicative of a map interaction descriptor, a map interaction session descriptor, etc. to a separate apparatus, and receive information indicative of the privacy setting from the separate apparatus.

In some circumstance, a user may desire to individually indicate privacy settings associated with particular map objects, with specific types of map objects, with map objects associated with particular map object properties, and/or the like. As such, it may be desirable to configure an apparatus such that the apparatus is responsive to user indication of various privacy settings. In at least one example embodiment, an apparatus causes display of a privacy setting user interface element. Such causation of display of the privacy setting user interface element may be based, at least in part, on determination of a map interaction descriptor, determination of a map interaction session descriptor, and/or the like. In such an example embodiment, the receipt of information indicative of the privacy setting may comprise receipt of information indicative of a privacy setting indication input that indicates a privacy setting that is associated with a particular map interaction descriptor, map interaction session descriptor, map object, map object property, and/or the like.

Once a privacy setting for a map interaction descriptor, a map interaction session descriptor, etc. has been determined, various privacy preserving measures may be applied prior to storing, processing, sharing, etc. such information with a third party, such as an advertiser, an analytics provider, a recommendation service, and/or the like. Such privacy preserving measures may facilitate the preservation of the user's private information by way of filtering, modifying, abstracting, generalizing, etc. the information comprised by a map interaction descriptor, a map interaction session descriptor, and/or the like. In at least one example embodiment, an apparatus determines a filtered map interaction descriptor based, at least in part, on the privacy setting and the map interaction descriptor. In such an example embodiment, the determination of the filtered map interaction descriptor may be performed such that the filtered map interaction descriptor is absent from at least a portion of the information comprised by the map information descriptor. For example, the filtered map interaction descriptor may be absent from at least a portion of the information indicative of the map object, the information indicative of the map operation, the information indicative of the map object property, and/or the like.

As discussed previously, the map interaction descriptor may be comprised by a map interaction session descriptor that comprises at least one other map interaction descriptor in addition to the map interaction descriptor. In such circumstances, the determination of the filtered map interaction descriptor may comprise determination of a filtered map interaction session descriptor based, at least in part, on the privacy setting and the map interaction session descriptor. In such an example, the determination of the filtered map interaction session descriptor may be performed such that the filtered map interaction session descriptor is absent from at least a portion of at least one map information descriptor comprised by the map interaction session descriptor. For example, the filtered map interaction session descriptor may be absent from at least a portion of the information indicative of a map object, the information indicative of a map operation, or the information indicative of a map object property that is comprised by the map interaction descriptor, the other map interaction descriptor, and/or the like.

In some circumstances, information comprised by a map interaction descriptor, a map interaction session descriptor, and/or the like may be abstracted in order to preserve the privacy of a user. For example, abstraction of the information may comprise changing of the information indicative of a map object to information indicative of a different map object, such as a map object that is less specific, more general, higher level, etc. For example, abstraction of a map interaction descriptor that indicates that a user zoomed in on a specific Italian restaurant in San Francisco may result in a filtered map interaction descriptor that indicates that the user zooned in on San Francisco. As such, abstraction of the information may comprise scaling or descaling a level of zoom at which a map object was originally viewed, scaling or descaling the specificity of the map object, reducing an amount of time that the user viewed the particular map object, and/or the like. Such abstraction may reduce the perceived significance of a particular map object to the user. In this manner, the duration, the level of detail, the level of zoom, etc. at which a user viewed and/or explored a portion of map information and/or a map object may be interpreted as corresponding with the user's interest in that object. As such, abstracting, randomizing, generalizing, etc. the duration, the level of zoom, the number and type of map object properties, etc. may facilitate in anonymizing the user's interest in those objects.

In this manner, in at least one example embodiment, the determination of the filtered map interaction descriptor comprises modification of the map interaction descriptor such that at least a portion of the map interaction descriptor is generalized. For example, the determination of the filtered map interaction descriptor may comprise causation of modification of the map interaction descriptor based, at least in part, on the privacy setting. Such generalization may be performed such that at least a portion of at least one of the information indicative of the map object, the information indicative of the map operation, or the information indicative of the map object property is generalized, abstracted, modified, deleted, and/or the like. The modification of the map interaction descriptor such that the portion of the map interaction descriptor is generalized may be based, at least in part, on a level of privacy indicated by the privacy setting. For example, the generalization, abstraction, modification, etc. may be proportional to a level of privacy indicated by the privacy setting. In such an example, a higher level of privacy may result in a higher level of generalization, abstraction, modification, etc., and a lower level of privacy may result in a lower level of generalization, abstraction, modification, etc. For example, a map interaction descriptor may indicate that a user zoomed into a hospital located in San Francisco at a high level of zoom. If it is determined that a high level of privacy is associated with such a map interaction descriptor, the map interaction descriptor may be filtered such that a filtered map interaction descriptor indicates that the user merely viewed San Francisco as a whole at a moderate level of zoom. If it is determined that a low level of privacy is associated with such a map interaction descriptor, the map interaction descriptor may be filtered such that a filtered map interaction descriptor indicates that the user merely viewed the region of San Francisco in which the hospital is located at a moderate level of zoom. In this manner, the determination of the filtered map interaction descriptor may be performed such that the filtered map interaction descriptor conveys less information associated with the map object than the map interaction descriptor.

For example, a user may view display region 331 of map information 330 while exploring map object 312, "Lafayette Park," similar as depicted regarding the example of FIG. 3D. In such an example, a map interaction descriptor may be determined that indicates the user's interactions with the map information via a mapping program. In some circumstances, the user may desire to have a privacy setting that indicates moderate level of privacy associated with public spaces, such as a park. Such a privacy setting may facilitate preservation of privacy associated with a possible location of the user in a particular city, during particular times of day, and/or the like. As such, a filtered map interaction descriptor may be determined such that the filtered map interaction descriptor indicates that the user merely viewed a portion of map information similar to map information 310 of FIG. 3B. In this manner, the filtered map interaction descriptor conveys less information associated with the user's interest in map object 312 of FIG. 3D. In another example, the user may desire to have a privacy setting that indicates high level of privacy associated with public spaces, such as a park. As such, a filtered map interaction descriptor may be determined such that the filtered map interaction descriptor indicates that the user merely viewed a portion of map information similar to map information 300 of FIG. 3A. In this manner, the filtered map interaction descriptor conveys even less information associated with the user's interest in map object 312 of FIG. 3D, as the filtered map interaction descriptor is more generalized, more abstracted, and/or the like.

In order to better determine a privacy setting associated with a particular map interaction descriptor, map interaction session descriptor, and/or the like, it may be desirable to aggregate map interaction descriptors, map interaction session descriptors, and/or the like over time such that a historical repository is formed. Over time, multiple user interaction sessions may be clustered to, for example, identify that a user prefers to view mapping objects of a certain type at a certain zoom level, that a user is primarily interested in specific map object properties of certain types of map objects, and/or the like. For example, a set of historical map interaction descriptors and/or map interaction session descriptors, $H_U$, may be represented by:

$$H_U = \{O_1, O_2, \ldots, O_m\},$$

where $H_U$ denotes the historical map interaction descriptors and/or historical map interaction session descriptors of user U In some circumstances, the novelty or newness of a particular map interaction descriptor and/or map interaction session descriptor may influence the determination of the privacy setting. For example, if a map interaction session descriptor is very similar to a historical map interaction descriptor that was associated with a privacy setting indicating a low level of privacy, it may be inferred that the current map interaction session descriptor may be similarly held by the user to a low level of privacy. As such, it may be desirable to compare a current map interaction descriptor and/or map interaction session descriptor to a historical map interaction descriptor and/or a historical map interaction session descriptor. In this manner, a level of novelty associated with a particular map interaction descriptor and/or a map interaction session descriptor may be quantified by comparing $O_s$ with each existing $O_i$ in $H_U$, and considering the smallest differentiation as its level of novelty. As such, the level of novelty associated with the smallest differentiation between the map interaction descriptor and a particular historical map interaction descriptor may be associated with the historical map interaction descriptor that most closely corresponds with the map interaction descriptor. In this manner, the map interaction descriptor comprises the least amount of new information associated with the user when compared to the particular historical map interaction descriptor.

The novelty score of $O_s$ may, for example, be computed as follows:

$$N(O_s) = \min((O_s - O_1), (O_s - O_2), \ldots, (O_s - O_m))$$

Other measures, such as a sum of the differentiations, a weighted sum of the differentiations, an average of the differentiations, a max of the differentiations, and/or the like may also be used to determine a level of novelty and, thus, a privacy setting, a level of privacy associated with a particular map interaction descriptor and/or a particular map interaction session descriptor, and/or the like. In another example, weight may be given based, at least in part, on a number of times the user has performed a similar map interaction descriptor, map interaction session descriptor, and/or the like in the past. Such repeat performance may imply that the map interaction descriptor, map interaction session descriptor, and/or the like is significant to the user, is held at a low level of privacy by the user, is held at a high level of privacy by the user, and/or the like. In at least one example embodiment, an apparatus determines a level of novelty associated with a map interaction descriptor, a map interaction session descriptor, and/or the like. In such an example embodiment, the privacy setting and/or the level of privacy indicated by the privacy setting may be determined based, at least in part, on the level of novelty.

In some circumstances, it may be desirable to reduce a level of novelty associated with a particular map interaction descriptor, map interaction session descriptor, and/or the like. For example, it may be desirable to modify a map interaction descriptor, a map interaction session descriptor, and/or the like such that the map interaction descriptor, the map interaction session descriptor, and/or the like more closely conforms with one or more historical map interaction descriptors, historical map interaction session descriptors, and/or the like. In this manner, a map interaction descriptor, a map interaction session descriptor, and/or the like may be filtered such that the information comprised by the filtered map interaction descriptor, the filtered map interaction session descriptor, and/or the like is associated with a lower level of novelty. For example, the user's map interaction descriptors, map interaction session descriptors, and/or the like may be modified such that its differentiation from the user's own historical data, or historical data of other users, is reduced. For example, given a user's map interaction descriptor and/or map interaction session descriptor $O_s$ and its closest match $O_i$ in $H_U$, an apparatus may anonymize the information comprised by the user's map interaction descriptor and/or map interaction session descriptor in $(O_s - O_i)$, before sharing $O_s$. In another example, only the conforming interaction data items of $O_s$ in $O_i$ may be shared with a third party. If the goal of sharing such map interaction descriptors and/or map interaction session descriptors is to benefit from a particular type of service provided by the third party, and sharing the data in $(O_s - O_i)$ is key to getting that service, then the most closely corresponding historical map interaction descriptor and/or historical map interaction session descriptor $O_j$ in $H_U$ may be chosen as a template to adapt $O_s$ prior to sharing of the information with the third party. In general, such a privacy preserving approach may reduce the novelty and/or the uniqueness of a user's map interaction descriptor and/or map interaction session descriptor, while preserving any potential functionality and/or service benefits which may be provided contingent upon sharing of the user's information.

As such, in at least one example embodiment, an apparatus determines that the map interaction session descriptor at least partially corresponds with at least a portion of at least one historical map interaction session descriptor. In such an example embodiment, the determination of the filtered map interaction session descriptor may comprise determination of the filtered map interaction session descriptor based, at least in part, on the privacy setting, the map interaction session descriptor, and the historical map interaction session descriptor. The filtered map interaction session descriptor may, for example, be determined such that the filtered map interaction session descriptor at least partially corresponds with the portion of the historical map interaction session descriptor and at least another portion of the historical map interaction session descriptor. In this manner, the filtered map interaction session descriptor may correspond with the historical map interaction session descriptor to a greater extent than the map interaction session descriptor corresponded with the historical map interaction session descriptor. Restated, a map interaction session descriptor may be filtered such that the filtered map interaction session descriptor corresponds with the historical map interaction session descriptor that most closely corresponded with the map interaction session descriptor.

In at least one example embodiment, the historical map interaction session descriptor is a user historical map interaction session descriptor. A user historical map interaction session descriptor may be, for example, a historical map interaction session descriptor that is associated with the user, a map interaction session descriptor that is indicative of map interactions performed by the user, and/or the like. In at least one example embodiment, the historical map interaction session descriptor is a cross-user historical map interaction session descriptor. A cross-user historical map interaction session descriptor may be, for example, a historical map interaction session descriptor that is associated with an individual other than the user, a map interaction session descriptor that is indicative of map interactions performed by an individual other than the user, and/or the like.

As discussed previously, the filtering of a map interaction descriptor and/or a map interaction session descriptor may be based, at least in part, on a privacy setting. For example, the modification of a map interaction session descriptor such that the map interaction session descriptor more closely corresponds with a historical map interaction session descriptor may be based, at least in part, on a level of privacy indicated by the privacy setting. In this manner, the modification of the map interaction session descriptor may be proportional to a level of privacy indicated by the privacy setting. For example, a high level of privacy may result in filtering of the map interaction session descriptor such that the filtered map interaction session descriptor exactly corresponds with a historical map interaction session descriptor, and a moderate level of privacy may result in filtering of the map interaction session descriptor such that the filtered map interaction session descriptor partially corresponds with the historical map interaction session descriptor.

In some circumstances, a sequence of map operations associated with a plurality of map objects may provide insight into a user's plans, a user's interests, and/or the like. As such, it may be desirable to analyze a map interaction session descriptor in order to identify any potential sequences which may affect the privacy of the user. In at least one example embodiment, a map information session descriptor is analyzed in order to identify a sequence in which a user interacted with a plurality of map objects. For instance, a map interaction session descriptor may comprise information indicative of a sequence of map operations associated with map objects where the user zoomed in on a map object associated with a shopping center, panned across a route, and settled on a map object associated with a park may imply that the user intends to shop or eat at the shopping center and, subsequently, walk or drive to the park.

Map interaction session descriptor $O_s$ with such sequential information embedded in it may be denoted as:

$$Seq(O_s)=(o_{s1},a_{s1},p_{s1})\text{-->}(o_{s2},a_{s2},p_{s2})\text{-->} \ldots \text{-->}(o_{sn},a_{sn},p_{sn})$$

In such situations, the particular sequence and/or subsequence of the map interaction session descriptor may reveal information associated with the user. For example, the sequence or sub-sequence may reveal personal information, identifying information regarding the user, location information regarding the probable location of the user at some point in the future, and/or the like. As such, it may be desirable to, at least partially, remove the information indicative of the sequence of occurrence of the map interaction descriptors comprised by the map interaction session descriptor.

For example, a map interaction session descriptor may comprise a map interaction descriptor and another map interaction descriptor. In at least one example embodiment, the map interaction session descriptor comprises information indicative of a chronological sequence of the map interaction descriptor and the other map interaction descriptor. For example, a map operation of the map interaction descriptor may be associated with a map operation time that indicates a time at which the map operation was performed, and another map operation of the other map interaction descriptor may be associated with another map operation time that indicates a time at which the other map operation was performed. In another example, the information indicative of the chronological sequence of the map interaction descriptor and the other map interaction descriptor may be information indicative of a time associated with the determination of the map interaction descriptor and information indicative of another time associated with the determination of the other map interaction descriptor. In such examples, the determination of the filtered map interaction descriptor may comprise modification of the map interaction session descriptor such that the map interaction session descriptor fails to comprise the information indicative of the chronological sequence of the map interaction descriptor and the other map interaction descriptor. For example, the information indicative of the chronological sequence of the map interaction descriptor and the other map interaction descriptor may be deleted, randomized, and/or the like.

In some circumstances, the order of map interaction descriptors within a map interaction session descriptor may be indicative of a sequence associated with the map interaction descriptors. In at least one example embodiment, the information indicative of the chronological sequence of the map interaction descriptor and the other map interaction descriptor is an order of the map interaction descriptor and the other map interaction descriptor within the map interaction session descriptor. For example, a map interaction descriptor that is subsequent to another map interaction descriptor within a map interaction session descriptor may be indicative of the map interaction descriptor occurring chronologically subsequent to the other map interaction descriptor. In such an example embodiment, the determination of the filtered map interaction descriptor may comprise modification of the map interaction session descriptor such that the order of the map interaction descriptor and the other map interaction descriptor in the map interaction session descriptor fails to be indicative of the chronological sequence of the map interaction descriptor and the other map interaction descriptor. For example, the order of the map interaction descriptors within the map interaction session descriptor may be randomized such that the order of the map interaction descriptors within the filtered map interaction session descriptor fails to convey information indicative of a chronological sequence of the map interaction descriptors.

Figure 3E:
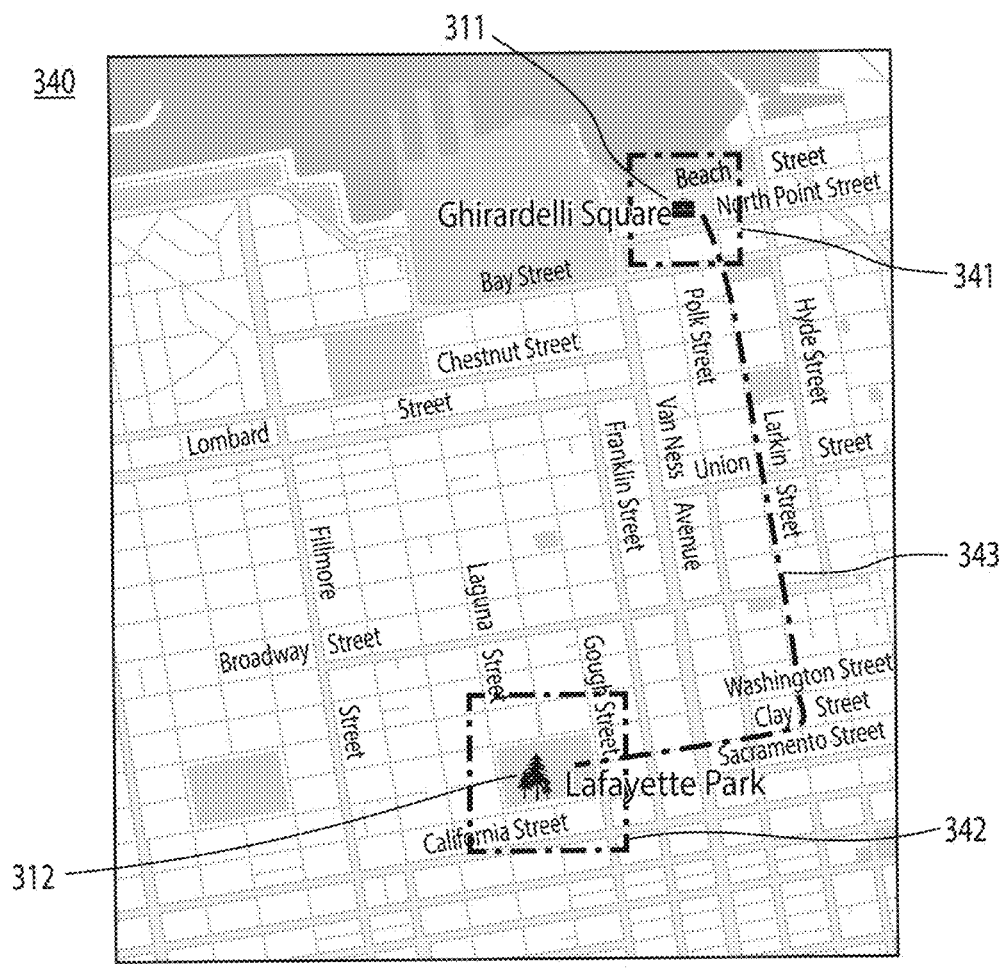

FIG. 3E is a diagram illustrating user interaction with a representation of map information according to at least one example embodiment. The example of FIG. 3E depicts map information 340, which is a representation of map information associated with a region of the city of San Francisco, Calif. As can be seen, map information 340 comprises representations of numerous map objects, including map object 311 and map object 312. Each of map objects 311 and 312 are representations of map objects. For example, various highways, streets, islands, parks, neighborhoods, and/or the like are represented in map information 340 by way of various graphical representations, textual representations, and/or the like. For example, map object 311 is associated with "Ghirardelli Square," and map object 312 is associated with "Lafayette Park." In the example of FIG. 3E, a user may initially view the entirety of map information 340 by way of the user's apparatus, may subsequently zoom in such that the user is viewing display region 341 of map information 340 centered upon map object 311, pan across the map following path 343, and zoom out slightly such that the user is viewing display region 342, which is centered upon map object 312. As can be see, display region 341 may correspond with display region 321 of FIG. 3C, and display region 342 may correspond with display region 331 of FIG. 3D.

Based upon the preceding user interactions, it may be inferred that the user intends to visit Ghirardelli Square, and travel along the panned-across route, namely, travel down Larkin St. and Clay St., to Lafayette Park. Further, while the user is viewing display region 341, which corresponds with display region 321 of FIG. 3C, the user may briefly zoom into or pan to map object 323 of FIG. 3C, and/or while the user is viewing display region 342, which corresponds with display region 331 of FIG. 3D, the user may briefly zoom into or pan to map object 333 of FIG. 3D. As can be seen, map object 323 of FIG. 3C and map object 333 of FIG. 3D are graphical representations of a bus stop. One or more map object properties may indicate that the bus stops are serviced by a common bus route, and that the route progresses in a north to south direction. In this manner, it may be inferred that the user intends to travel from Ghirardelli Square to Lafayette Park by way of a bus on the indicated bus route. In another example, while the user is viewing display region 341, which corresponds with display region 321 of FIG. 3C, the user may briefly zoom into or pan to map object 322 of FIG. 3C, and/or while the user is viewing display region 342, which corresponds with display region 331 of FIG. 3D, the user may briefly zoom into or pan to map object 332 of FIG. 3D. As can be seen, map object 322 of FIG. 3C and map object 332 of FIG. 3D are graphical representations of a parking garage. One or more map object properties may indicate that the parking garage is open to the public, that the parking garage has available spaces, and/or the like. In this manner, it may be inferred that the user intends to travel from Ghirardelli Square to Lafayette Park by way of a personal vehicle, and intends to park in the parking garages indicated by map objects 323 and 332.

In such an example, it may be desirable to determine a filtered map interaction session descriptor such that the filtered map interaction session descriptor fails to comprise information indicative of a sequence of the user interactions, fails to comprise information that may allow certain inferences to be drawn regarding a route and/or a mode of transportation between map objects, fails to comprise information that identifies Ghirardelli Square and/or Lafayette Park as potential destinations, and/or the like.

In some circumstances, a map interaction session descriptor may comprise information that allows the unique identification of a particular user. For example, a particular user may follow a route that is unique to the user. As such, even if browsing anonymously, an individual that follows such a unique route may be inferred to be the user. As such, it may be desirable to determine a level of uniqueness of a map interaction session descriptor. For example, a user's map interaction session descriptor may be compared to cross-user historical map interaction session descriptors in order to quantify a uniqueness of the user's map interaction session descriptor. A cross-user historical map interaction session descriptor may be, for example, a historical map interaction session descriptor that is associated with an individual other than the user, a map interaction session descriptor that is indicative of map interactions performed by an individual other than the user, and/or the like. In this manner, it may be determined whether a particular user may be identified based, at least in part, on a uniqueness of the user's map interaction session descriptor. For example, a user U's current map interaction session descriptor $O_s$ may be compared with those of other users. In such an example, an aggregation of cross-user historical map interaction session descriptors $\{H_{U1}, H_{U2}, \ldots, H_{Un}\}$ correspond with users $\{U_1, U_2, \ldots, U_n\}$, respectively. As such, the level of uniqueness of $O_s$ may be computed as follows:

$$U(O_s)=[(O_s-O_{U11})+(O_s-O_{U12})+ \ldots (O_s-O_{U1m})]+ \\ [(O_s-O_{U21})+(O_s-O_{U22})+ \ldots (O_s-O_{U2m})] \ldots \\ +[(O_s-O_{Un1})+(O_s-O_{Un2})+ \ldots (O_s-O_{Unm})]$$

In some circumstances, it may be desirable to determine a level of uniqueness of a map interaction session descriptor based, at least in part, on comparison of the map interaction session descriptor to user historical map interaction session descriptors. As such, in at least one example embodiment, an apparatus determines a user uniqueness of the map interaction session descriptor based, at least in part, on the map interaction session descriptor and a plurality of user historical map interaction session descriptors. In such an example embodiment, the determination of the filtered map interaction descriptor may be based, at least in part, on the user uniqueness of the map interaction session. The level of uniqueness of a sequence and/or sub-sequence of map interaction descriptors within a map interaction session descriptor, $U(Seq(O_s))$, may be computed analogously. For example, in at least one example embodiment, an apparatus determines a user sequence uniqueness of the map interaction session descriptor based, at least in part, on the map interaction session descriptor and a plurality of user historical map interaction session descriptors. In such an example embodiment, the determination of the filtered map interaction descriptor may be based, at least in part, on the user sequence uniqueness of the map interaction session.

In some circumstances, it may be desirable to determine a level of uniqueness of a map interaction session descriptor based, at least in part, on comparison of the map interaction session descriptor to cross-user historical map interaction session descriptors. In at least one example embodiment, an apparatus determines a non-user uniqueness of the map interaction session descriptor based, at least in part, on the map interaction session descriptor and a plurality of cross-user historical map interaction session descriptors. In such an example embodiment, the determination of the filtered map interaction descriptor may be based, at least in part, on the non-user uniqueness of the map interaction session. The level of uniqueness of a sequence and/or sub-sequence of map interaction descriptors within a map interaction session descriptor, $U(Seq(O_s))$, may be computed analogously. For example, in at least one example embodiment, an apparatus determines a non-user sequence uniqueness of the map interaction session descriptor based, at least in part, on the map interaction session descriptor and a plurality of cross-user historical map interaction session descriptors. In such an example embodiment, the determination of the filtered map interaction descriptor may be based, at least in part, on the non-user sequence uniqueness of the map interaction session.

In this manner, a privacy setting and/or a level of privacy indicated by the privacy setting may be determined based, at least in part, on a function of a user sensitivity to a particular map object or map object property, a level of novelty associated with a map interaction session descriptor, a level of uniqueness associated with the map interaction session descriptor, a user sensitivity to a sequence of map objects or map object properties, a level of novelty associated with a sequence of a map interaction session descriptor, a level of uniqueness associated with the sequence of the map interaction session descriptor, and/or the like. For map interaction session descriptor $O_s$, a level of privacy $P(O_s)$ may be represented as:

$$P(O_s)=f(S(O_s),N(O_s),\mathcal{N}(O_s),S(\text{Seq}(O_s)),\mathcal{N}(\text{Seq}(O_s)),U(\text{Seq}(O_s)))$$

In some circumstances, it may be desirable to cause deletion of one or more map interaction descriptors comprised by a map interaction session descriptor. For example, if a privacy setting indicates that information associated with a particular map object, map object property, and/or the like is not to be shared with a third party, it may be desirable to determine a filtered map interaction session descriptor such that the filtered map interaction session descriptor fails to comprise the map interaction descriptor.

In order to facilitate the sharing of the filtered information, it may be desirable to send information indicative of a filtered map interaction descriptor, a filtered map interaction session descriptor, and/or the like to a separate apparatus. In at least one example embodiment, an apparatus causes sending of information indicative of the filtered map interaction descriptor to a separate apparatus. In at least one example embodiment, the causation of sending of information indicative of the filtered map interaction descriptor comprises causation of sending of information indicative of a filtered map interaction session descriptor to the separate apparatus.

FIGS. 4A-4E are diagrams illustrating data associations according to at least one example embodiment. The examples of FIGS. 4A-4E are merely examples and do not limit the scope of the claims. For example, data associations may vary, data structures may vary, data structure configuration may vary, map interaction session descriptor configuration, arrangement, and/or content may vary, filtered interaction session descriptor configuration, arrangement, and/or content may vary, and/or the like.

As discussed previously, in many circumstances, a map object may be associated with a plurality of map object properties. Such map object properties may categorize the type of map object, may identify a service provided at a location indicated by a map object, and/or the like.

FIG. 4A is a diagram illustrating a map object-map object property data association according to at least one example embodiment. In the example of FIG. 4A, map object 400 is associated with map object property 401, 402, 403, and 404. For example, map object property 401 may indicate that map object 400 is a restaurant, map object property 402 may indicate that Italian food is served at the establishment represented by map object 400, map object property 403 may indicate the hours of service of the restaurant, and map object property 404 may indicate a physical address of the restaurant. Although the example of FIG. 4A depicts four map object properties associated with map object 400, a map object may be associated with any number of map object properties, any type of map object properties, and/or the like.

As described regarding the examples of FIGS. 3A-3E, a map interaction session descriptor may comprise a plurality of map interaction descriptors. Such a map interaction session descriptor may be indicative of any number of user interactions, user invoked map operations, etc. associated with map information, a representation of map information, and/or the like.

FIG. 4B is a diagram illustrating a map interaction session descriptor according to at least one example embodiment. The example of FIG. 4B depicts map interaction session descriptor 410. As can be seen, map interaction session descriptor 410 comprises map interaction descriptor 412, map interaction descriptor 414, map interaction descriptor 416, and map interaction descriptor 418. In the example of FIG. 4B, map interaction descriptor 412 comprises information indicative of map object 412A, information indicative of map object property 412B, and information indicative of map operation 412C, map interaction descriptor 414 comprises information indicative of map object 414A, information indicative of map object property 414B, and information indicative of map operation 414C, map interaction descriptor 416 comprises information indicative of map object 416A, information indicative of map object property 416B, and information indicative of map operation 416C, and map interaction descriptor 418 comprises information indicative of map object 418A, information indicative of map object property 418B, and information indicative of map operation 418C. In the example of FIG. 4B, each of map object property 412B, 414B, 416B, and 418B may represent a single map object property associated with the respective map object, a plurality of map object properties associated with the respective map object, and/or the like.

For example, map interaction descriptor 412 may indicate that a user performed a zoom map operation that focused on a location associated with an Italian restaurant that is located at a particular address and is open for lunch. Map interaction descriptor 414 may, for example, indicate that the user panned along a particular pedestrian pathway. Map interaction descriptor 416 may, for instance, indicate that the user selected a representation of a map object that identifies a park that closes at 10:00 PM and has a playground and a swimming pool. Map interaction descriptor 418 may, for example, indicate that the user zoomed in on a particular bus stop that services a particular bus route. As can be seen from the preceding examples, it may be inferred from the information comprised by map interaction session descriptor 410 that the user may be planning to eat at the Italian restaurant, walk from the Italian restaurant to the park, and take the bus from the park to a location proximate to the bus route.

As discussed previously, in many circumstances, it may be desirable to determine a filtered map interaction descriptor, a filtered map interaction session descriptor, and/or the like.

FIG. 4C is a diagram illustrating a filtered map interaction session descriptor according to at least one example embodiment. The example of FIG. 4C depicts filtered map interaction session descriptor 420 that is based, at least in part, on map interaction session descriptor 410 of FIG. 4B. As can be seen, map interaction session descriptor 420 comprises map interaction descriptor 416 in its entirety such that map interaction descriptor 416 of FIG. 4C corresponds with map interaction descriptor 416 of FIG. 4B. In this manner, it may be inferred that map interaction descriptor failed to comprise information which may have affected the privacy of the user, failed to comprise information which could have been utilized to uniquely identify the user, and/or the like. Alternatively, map interaction descriptor 416 may have been identified by the user to be associated with privacy setting that indicated a low level of privacy for the map object of the map interaction descriptor. In the example of FIG. 4C, map interaction descriptor 413 corresponds with a filtered version of map interaction descriptor 412 of FIG. 4B, and map interaction descriptor 419 of FIG. 4C corresponds with a filtered version of map interaction descriptor 418 of FIG. 4B.

For example, it can be see that, in comparing map interaction descriptor 412 of FIG. 4B with map interaction descriptor 413 of FIG. 4C, map object 412A has been changed to map object 413A, map object property 412B remains constant between the two figures, and map operation 412C has been changed to map operation 413C. In this manner, filtered map interaction descriptor 413 may have been abstracted, generalized, filtered, and/or the like based, at least in part, on a privacy setting and on map interaction descriptor 412 of FIG. 4B. As such, filtered map interaction descriptor 413 may fail to comprise information that affects the privacy of the user, fail to comprise information which may be used to uniquely identify the user, and/or the like.

In another example, it can be see that, in comparing map interaction descriptor 418 of FIG. 4B with map interaction descriptor 419 of FIG. 4C, map object 418A has been changed to map object 419A, map object property 418B has been changed to map object property 419B, and map operation 418C remains constant between the two figures. In this manner, filtered map interaction descriptor 419 may have been abstracted, generalized, filtered, and/or the like based, at least in part, on a privacy setting and on map interaction descriptor 418 of FIG. 4B. As such, filtered map interaction descriptor 419 may fail to comprise information that affects the privacy of the user, fail to comprise information which may be used to uniquely identify the user, and/or the like.

FIG. 4D is a diagram illustrating a map interaction session descriptor according to at least one example embodiment. The example of FIG. 4D depicts map interaction session descriptor 430. As can be seen, map interaction session descriptor 430 comprises map interaction descriptor 432, map interaction descriptor 434, map interaction descriptor 436, and map interaction descriptor 438. In the example of FIG. 4D, map interaction descriptor 432 comprises information indicative of map object 412A, information indicative of map object property 412B, information indicative of map operation 412C, and information indicative of map operation time 412D, map interaction descriptor 434 comprises information indicative of map object 414A, information indicative of map object property 414B, information indicative of map operation 414C, and information indicative of map operation time 414D, map interaction descriptor 436 comprises information indicative of map object 416A, information indicative of map object property 416B, information indicative of map operation 416C, and information indicative of map operation time 416D, and map interaction descriptor 438 comprises information indicative of map object 418A, information indicative of map object property 418B, information indicative of map operation 418C, and information indicative of map operation time 418D. In the example of FIG. 4D, each of map object property 412B, 414B, 416B, and 418B may represent a single map object property associated with the respective map object, a plurality of map object properties associated with the respective map object, and/or the like.

For example, map interaction descriptor 432 may indicate that a user performed a zoom map operation that focused on a location associated with an Italian restaurant that is located at a particular address and is open for lunch at 10:34 AM. Map interaction descriptor 434 may, for example, indicate that the user panned along a particular pedestrian pathway at 10:33 AM. Map interaction descriptor 436 may, for instance, indicate that the user selected a representation of a map object that identifies a park that has a playground and a swimming pool at 10:32 AM. Map interaction descriptor 438 may, for example, indicate that the user zoomed in on a particular bus stop that services a particular bus route at 10:31 AM. As can be seen from the preceding examples, it may be inferred from the information comprised by map interaction session descriptor 430 that the user may be planning to take a bus to the park, then walk from the park to an Italian restaurant, and eat at the Italian restaurant. Such an inference may be based, at least in part, on map operation times 412D, 414D, 416D, and 418D, which indicate a chronological sequence associated with map interaction descriptors 432, 434, 436, and 438, respectively.

As described previously, in some circumstances, it may be desirable to determine a filtered map interaction session descriptor such that the filtered map interaction session descriptor fails to comprise information indicative of a chronological sequence associated with filtered map interaction descriptors comprised by the filtered map interaction session descriptor. FIG. 4E is a diagram illustrating a filtered map interaction session descriptor according to at least one example embodiment. The example of FIG. 4E depicts filtered map interaction session descriptor 440 that is based, at least in part, on map interaction session descriptor 430 of FIG. 4D. As can be seen, filtered map interaction session descriptor 440 fails to comprise information indicative of map operation times 412D, 414D, 416D, and 418D of FIG. 4D. Further, as can be seen, filtered map information descriptors 444, 442, 448, and 446 correspond with a rearranged sequence of map interaction descriptors 434, 432, 438, and 436, respectively. As can be seen, filtered map interaction session descriptor 440 fails to comprise information indicative of a chronological sequence of filtered map interaction descriptors 444, 442, 448, and 446.

Figure 5:
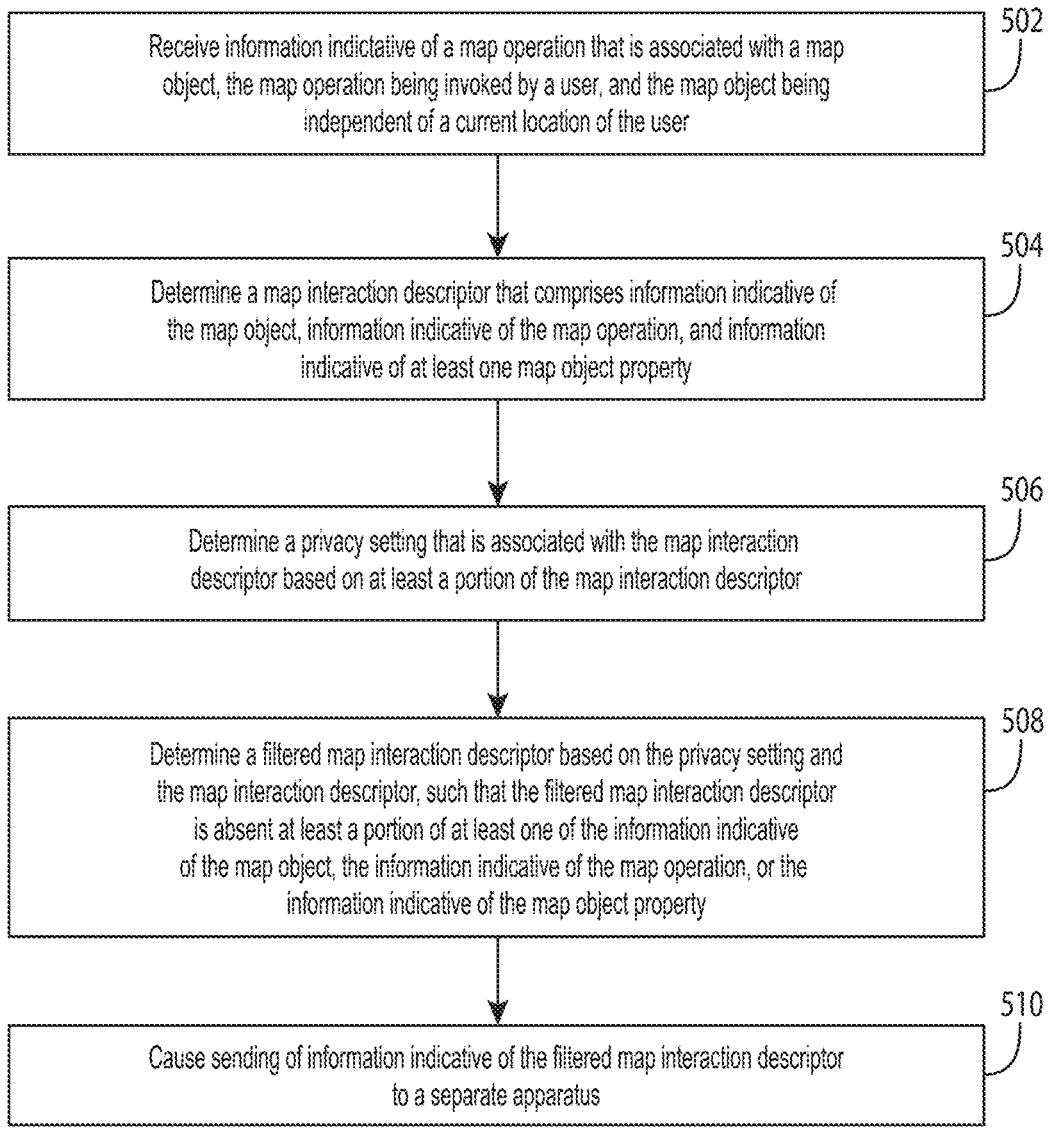
FIG. 5 is a flow diagram illustrating activities associated with determination of a filtered map interaction descriptor according to at least one example embodiment.

FIG. 5 is a flow diagram illustrating activities associated with determination of a filtered map interaction descriptor according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus receives information indicative of a map operation that is associated with a map object. In at least one example embodiment, the map operation is invoked by a user. In at least one example embodiment, the map object is independent of a current location of the user. The receipt, the map operation, the map object, the user, and the current location of the user may be similar as described regarding FIG. 2, FIGS. 3A-3E, and FIGS. 4A-4E.

At block 504, the apparatus determines a map interaction descriptor that comprises information indicative of the map object, information indicative of the map operation, and information indicative of at least one map object property of the map object. The determination, the map interaction descriptor, and the map object property may be similar as described regarding FIGS. 3A-3E and FIGS. 4A-4E.

At block 506, the apparatus determines a privacy setting that is associated with the map interaction descriptor based, at least in part, on at least a portion of the map interaction descriptor. The determination, the privacy setting, and the portion of the map interaction descriptor may be similar as described regarding FIGS. 3A-3E and FIGS. 4A-4E.

At block 508, the apparatus determines a filtered map interaction descriptor based, at least in part, on the privacy setting and the map interaction descriptor. In at least one example embodiment, the determination of the filtered map interaction descriptor is performed such that the filtered map interaction descriptor is absent from at least a portion of at least one of the information indicative of the map object, the information indicative of the map operation, or the information indicative of the map object property. The determination, the filtered map interaction descriptor, and the portion of the at least one of the information indicative of the map object, the information indicative of the map operation, or the information indicative of the map object property may be similar as described regarding FIGS. 3A-3E and FIGS. 4A-4E.

At block 510, the apparatus causes sending of information indicative of the filtered map interaction descriptor to a separate apparatus. The causation of sending and the separate apparatus may be similar as described regarding FIG. 2, FIGS. 3A-3E, and FIGS. 4A-4E.

Figure 6:
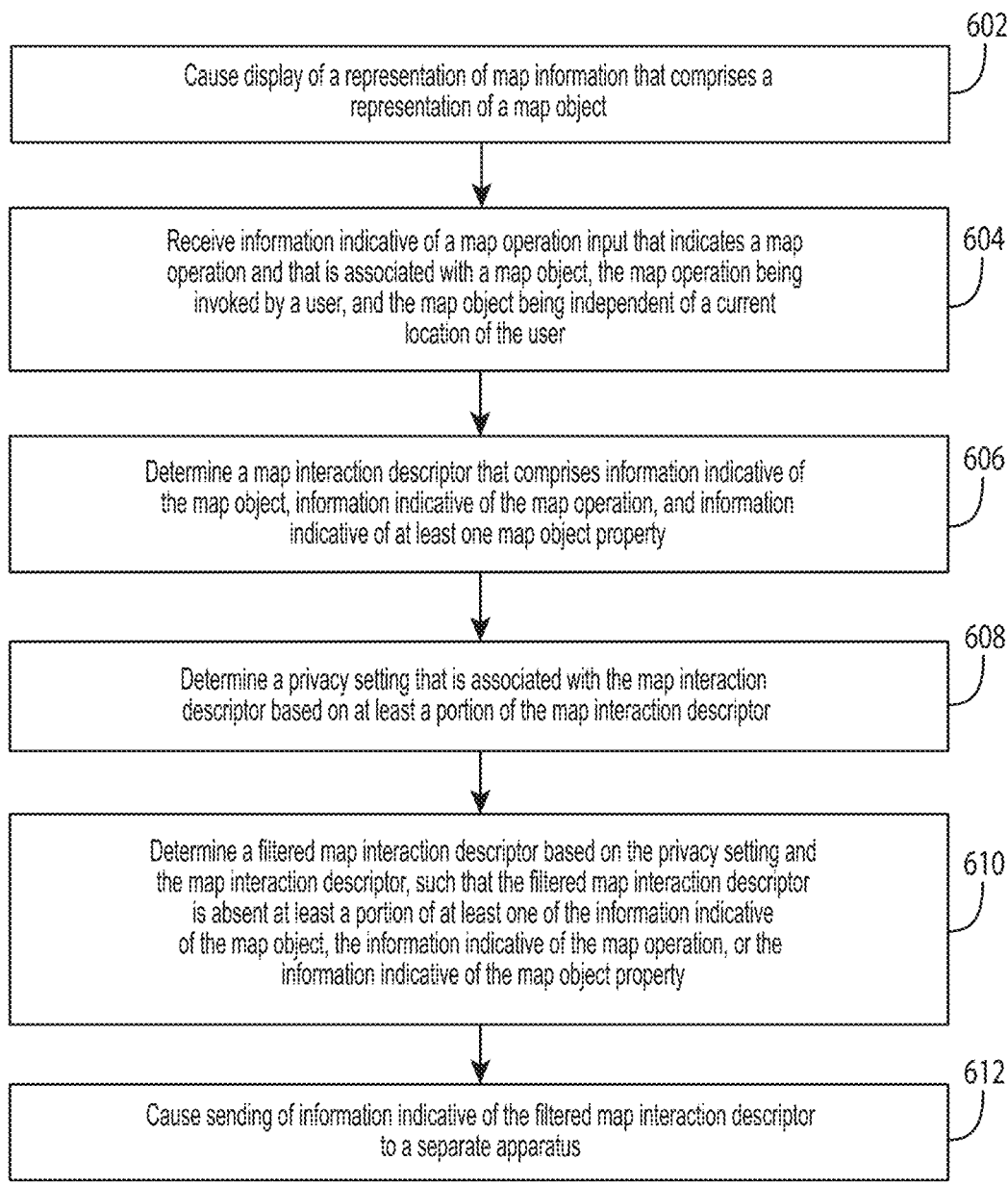
FIG. 6 is a flow diagram illustrating activities associated with determination of a filtered map interaction descriptor according to at least one example embodiment.

FIG. 6 is a flow diagram illustrating activities associated with determination of a filtered map interaction descriptor according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

As discussed previously, in some circumstances, the apparatus may cause display of a representation of map information. In such circumstances, the apparatus may receive a map operation input that is associated with the representation of the map information.

At block 602, the apparatus causes display of a representation of map information. In at least one example embodiment, the map information comprises information indicative of a map object. In at least one example embodiment, the representation of map information comprises a representation of a map object. The causation of display, the representation of the map information, the map object, and the representation of the map object may be similar as described regarding FIGS. 3A-3E and FIGS. 4A-4E.

At block 604, the apparatus receives information indicative of a map operation input that indicates a map operation and that is associated with a map object. In at least one example embodiment, the map operation is invoked by a user. In at least one example embodiment, the map object is independent of a current location of the user. The receipt, the map operation, the map object, the user, and the current location of the user may be similar as described regarding FIG. 2, FIGS. 3A-3E, and FIGS. 4A-4E.

At block 606, the apparatus determines a map interaction descriptor that comprises information indicative of the map object, information indicative of the map operation, and information indicative of at least one map object property of the map object. The determination, the map interaction descriptor, and the map object property may be similar as described regarding FIGS. 3A-3E and FIGS. 4A-4E.

At block 608, the apparatus determines a privacy setting that is associated with the map interaction descriptor based, at least in part, on at least a portion of the map interaction descriptor. The determination, the privacy setting, and the portion of the map interaction descriptor may be similar as described regarding FIGS. 3A-3E and FIGS. 4A-4E.

At block 610, the apparatus determines a filtered map interaction descriptor based, at least in part, on the privacy setting and the map interaction descriptor. In at least one example embodiment, the determination of the filtered map interaction descriptor is performed such that the filtered map interaction descriptor is absent from at least a portion of at least one of the information indicative of the map object, the information indicative of the map operation, or the information indicative of the map object property. The determination, the filtered map interaction descriptor, and the portion of the at least one of the information indicative of the map object, the information indicative of the map operation, or the information indicative of the map object property may be similar as described regarding FIGS. 3A-3E and FIGS. 4A-4E.

At block 612, the apparatus causes sending of information indicative of the filtered map interaction descriptor to a separate apparatus. The causation of sending and the separate apparatus may be similar as described regarding FIG. 2, FIGS. 3A-3E, and FIGS. 4A-4E.

Figure 7:
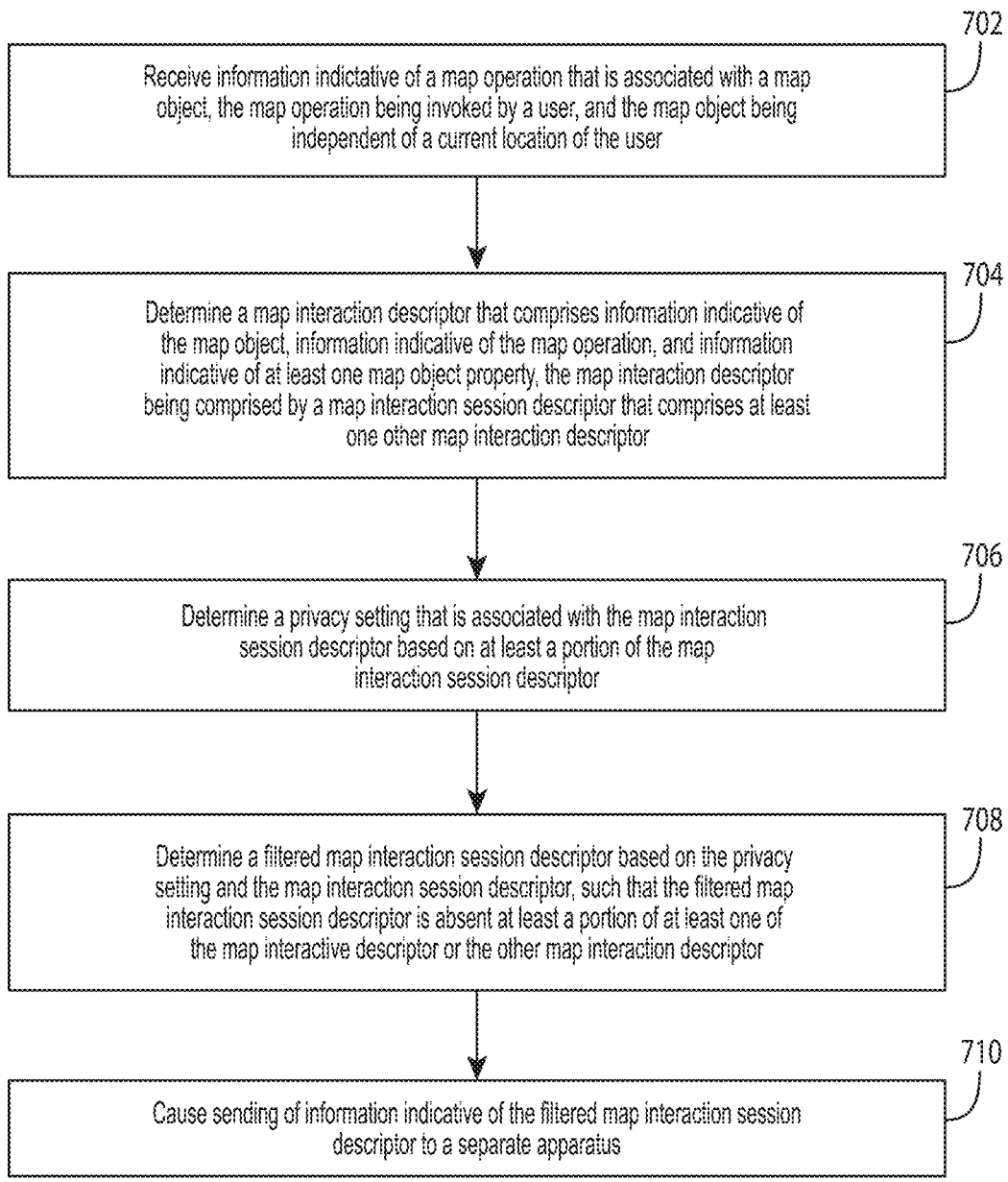
FIG. 7 is a flow diagram illustrating activities associated with determination of a filtered map interaction session descriptor according to at least one example embodiment.

FIG. 7 is a flow diagram illustrating activities associated with determination of a filtered map interaction session descriptor according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As discussed previously, in some circumstances, an apparatus may determine a privacy setting that is associated with a map interaction session descriptor that comprises at least one map interaction descriptor. In such circumstances, the apparatus may determine a filtered map interaction session descriptor and cause sending of the filtered map interaction session descriptor to a separate apparatus.

At block 702, the apparatus receives information indicative of a map operation that is associated with a map object. In at least one example embodiment, the map operation is invoked by a user. In at least one example embodiment, the map object is independent of a current location of the user. The receipt, the map operation, the map object, the user, and the current location of the user may be similar as described regarding FIG. 2, FIGS. 3A-3E, and FIGS. 4A-4E.

At block 704, the apparatus determines a map interaction descriptor that comprises information indicative of the map object, information indicative of the map operation, and information indicative of at least one map object property of the map object. In at least one example embodiment, the map interaction descriptor is comprised by a map interaction session descriptor that comprises at least one other map interaction descriptor. The determination, the map interaction descriptor, the map object property, and the map interaction session descriptor may be similar as described regarding FIGS. 3A-3E and FIGS. 4A-4E.

At block 706, the apparatus determines a privacy setting that is associated with the map interaction session descriptor based, at least in part, on at least a portion of the map interaction session descriptor. The determination, the privacy setting, and the portion of the map interaction session descriptor may be similar as described regarding FIGS. 3A-3E and FIGS. 4A-4E.

At block 708, the apparatus determines a filtered map interaction session descriptor based, at least in part, on the privacy setting and the map interaction session descriptor. In at least one example embodiment, the determination of the filtered map interaction session descriptor is performed such that the filtered map interaction descriptor is absent from at least a portion of at least one of the map interaction descriptor or the other map interaction descriptor. The determination, the filtered map interaction session descriptor, and the portion of the at least one of the map interaction descriptor or the other map interaction descriptor may be similar as described regarding FIGS. 3A-3E and FIGS. 4A-4E.

At block 710, the apparatus causes sending of information indicative of the filtered map interaction session descriptor to a separate apparatus. The causation of sending and the separate apparatus may be similar as described regarding FIG. 2, FIGS. 3A-3E, and FIGS. 4A-4E.

Figure 8:
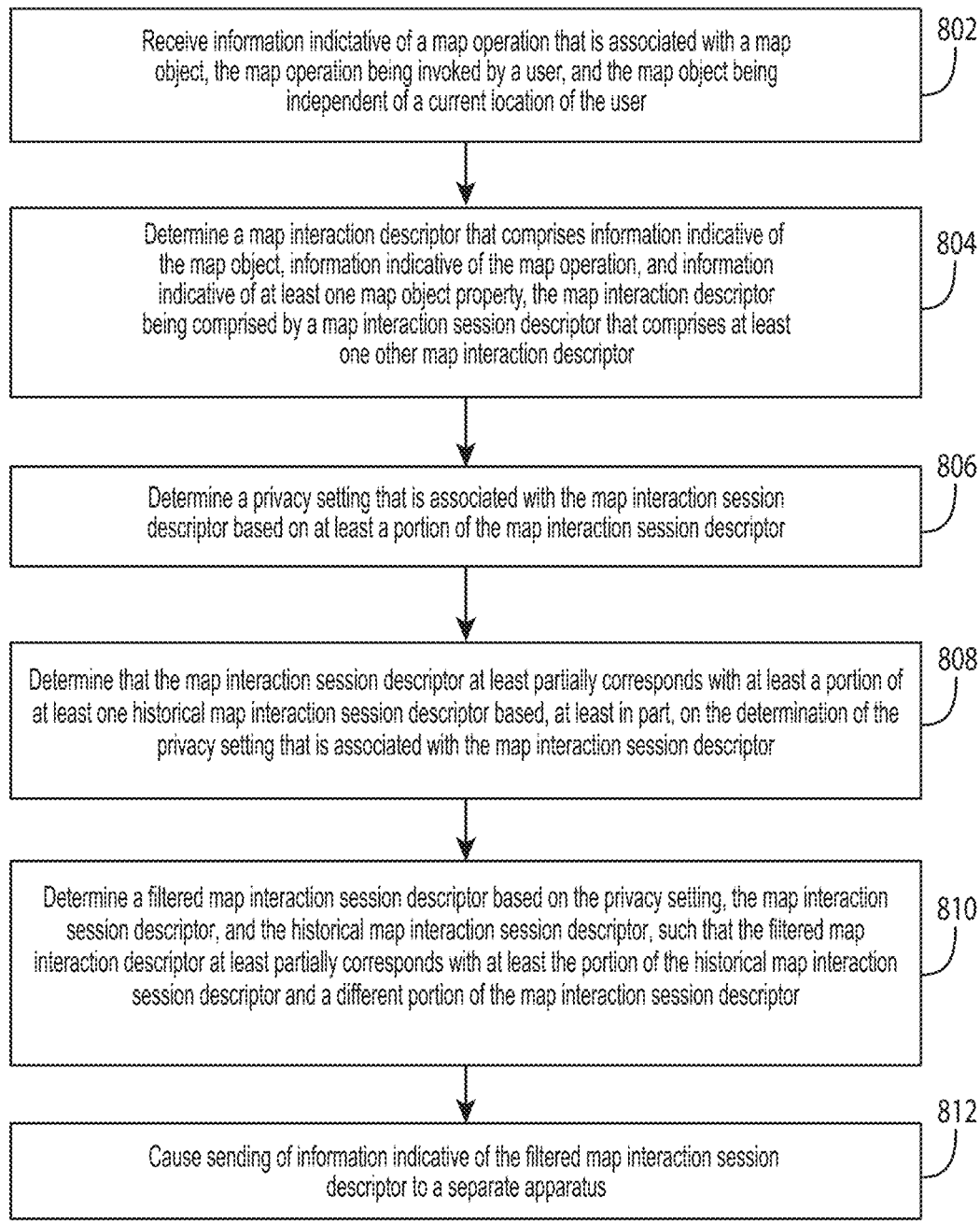
FIG. 8 is a flow diagram illustrating activities associated with determination of a filtered map interaction session descriptor according to at least one example embodiment.

FIG. 8 is a flow diagram illustrating activities associated with determination of a filtered map interaction session descriptor according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As discussed previously, in some circumstances, it may be desirable to determine a filtered map interaction session descriptor based, at least in part, a historical map interaction session descriptor.

At block 802, the apparatus receives information indicative of a map operation that is associated with a map object. In at least one example embodiment, the map operation is invoked by a user. In at least one example embodiment, the map object is independent of a current location of the user. The receipt, the map operation, the map object, the user, and the current location of the user may be similar as described regarding FIG. 2, FIGS. 3A-3E, and FIGS. 4A-4E.

At block 804, the apparatus determines a map interaction descriptor that comprises information indicative of the map object, information indicative of the map operation, and information indicative of at least one map object property of the map object. In at least one example embodiment, the map interaction descriptor is comprised by a map interaction session descriptor that comprises at least one other map interaction descriptor. The determination, the map interaction descriptor, the map object property, and the map interaction session descriptor may be similar as described regarding FIGS. 3A-3E and FIGS. 4A-4E.

At block 806, the apparatus determines a privacy setting that is associated with the map interaction session descriptor based, at least in part, on at least a portion of the map interaction session descriptor. The determination, the privacy setting, and the portion of the map interaction session descriptor may be similar as described regarding FIGS. 3A-3E and FIGS. 4A-4E.

At block 808, the apparatus determines that the map interaction session descriptor at least partially corresponds with at least a portion of at least one historical map interaction session descriptor based, at least in part, on the determination of the privacy setting that is associated with the map interaction session descriptor. The determination and the historical map interaction session descriptor may be similar as described regarding FIGS. 3A-3E and FIGS. 4A-4E.

At block 810, the apparatus determines a filtered map interaction session descriptor based, at least in part, on the privacy setting, the map interaction session descriptor, and the historical map interaction session descriptor. In at least one example embodiment, the determination of the filtered map interaction session descriptor is performed such that the filtered map interaction descriptor at least partially corresponds with at least the portion of the historical map interaction session descriptor and a different portion of the map interaction session descriptor. The determination, the filtered map interaction session descriptor, and the portion of the at least one of the map interaction descriptor or the other map interaction descriptor may be similar as described regarding FIGS. 3A-3E and FIGS. 4A-4E.

At block 812, the apparatus causes sending of information indicative of the filtered map interaction session descriptor to a separate apparatus. The causation of sending and the separate apparatus may be similar as described regarding FIG. 2, FIGS. 3A-3E, and FIGS. 4A-4E.

Figure 9:
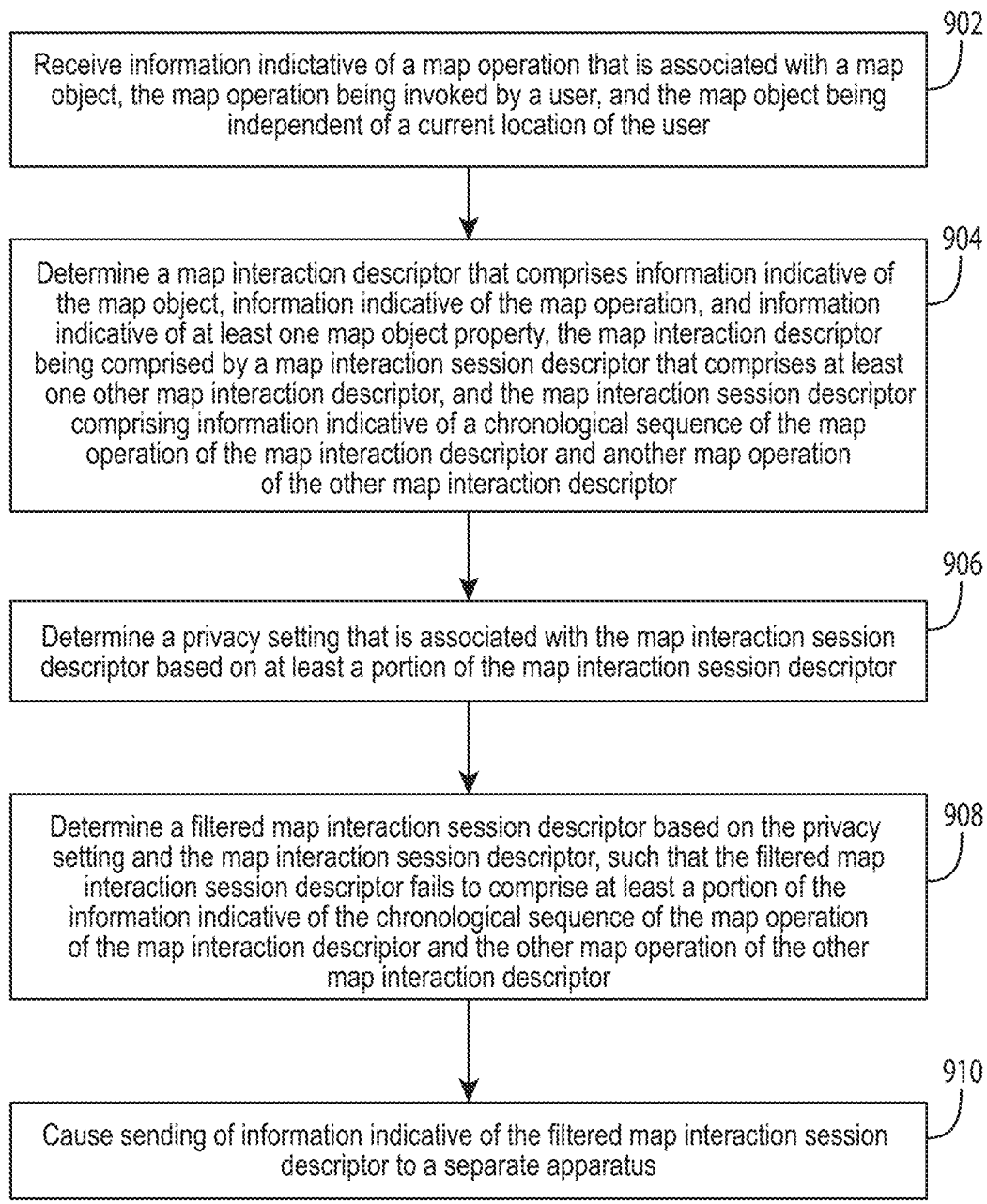
FIG. 9 is a flow diagram illustrating activities associated with determination of a filtered map interaction session descriptor according to at least one example embodiment.

FIG. 9 is a flow diagram illustrating activities associated with determination of a filtered map interaction session descriptor according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As discussed previously, in some circumstances, a map interaction session descriptor may comprise information indicative of a chronological sequence associated with map interaction descriptors comprised by the map interaction session descriptor. In such circumstances, it may be desirable to determine a filtered map interaction session descriptor such that the filtered map interaction session descriptor comprises the map interaction descriptors, and fails to comprise the information indicative of the chronological sequence of the map interaction descriptors.

At block 902, the apparatus receives information indicative of a map operation that is associated with a map object. In at least one example embodiment, the map operation is invoked by a user. In at least one example embodiment, the map object is independent of a current location of the user. The receipt, the map operation, the map object, the user, and the current location of the user may be similar as described regarding FIG. 2, FIGS. 3A-3E, and FIGS. 4A-4E.

At block 904, the apparatus determines a map interaction descriptor that comprises information indicative of the map object, information indicative of the map operation, and information indicative of at least one map object property of the map object. In at least one example embodiment, the map interaction descriptor is comprised by a map interaction session descriptor that comprises at least one other map interaction descriptor. In at least one example embodiment, the map interaction session descriptor comprises information indicative of a chronological sequence of the map operation of the map interaction descriptor and of another map operation of the other map interaction descriptor. The determination, the map interaction descriptor, the map object property, the map interaction session descriptor, the information indicative of the chronological sequence, and the other map operation of the other map interaction descriptor may be similar as described regarding FIGS. 3A-3E and FIGS. 4A-4E.

At block 906, the apparatus determines a privacy setting that is associated with the map interaction session descriptor based, at least in part, on at least a portion of the map interaction session descriptor. In at least one example embodiment, the determination of the privacy setting that is associated with the map interaction session descriptor is based, at least in part, on the information indicative of the chronological sequence. The determination, the privacy setting, and the portion of the map interaction session descriptor may be similar as described regarding FIGS. 3A-3E and FIGS. 4A-4E.

At block 908, the apparatus determines a filtered map interaction session descriptor based, at least in part, on the privacy setting and the map interaction session descriptor. In at least one example embodiment, the determination of the filtered map interaction session descriptor is performed such that the filtered map interaction descriptor fails to comprise at least a portion of the information indicative of the chronological sequence of the map operation of the map interaction descriptor and of the other map operation of the other map interaction descriptor. The determination, the filtered map interaction session descriptor, and the portion of the information indicative of the chronological sequence may be similar as described regarding FIGS. 3A-3E and FIGS. 4A-4E.

At block 910, the apparatus causes sending of information indicative of the filtered map interaction session descriptor to a separate apparatus. The causation of sending and the separate apparatus may be similar as described regarding FIG. 2, FIGS. 3A-3E, and FIGS. 4A-4E.

One or more example embodiments may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 806 of FIG. 8 may be performed after block 808 of FIG. 8. Furthermore, if desired, one or more of the above-described functions may be optional or may be combined. For example, block 708 of FIG. 7 may be optional and/or combined with block 704 of FIG. 7.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. An apparatus, comprising:
at least one processor; and
at least one memory including computer program code, the memory and the computer program code configured to, working with the processor, cause the apparatus to perform at least the following:
receive information indicative of a map operation that is associated with a map object, the map operation being invoked by a user of a wireless communication device, and the map object being independent of a current location of the user;
determine a map interaction descriptor that comprises information indicative of the map object, information indicative of the map operation, and information indicative of at least one map object property, wherein the map interaction descriptor comprises a map interaction session descriptor that provides information from which it is determinable as to whether a particular user is uniquely identifiable;
determine a privacy setting that is associated with the map interaction descriptor based, at least in part, on at least a portion of the map interaction descriptor;
determine a filtered map interaction descriptor based, at least in part, on the privacy setting and the map interaction descriptor, such that the filtered map interaction descriptor is absent from at least a portion of at least one of the information indicative of the map object, the information indicative of the map operation, or the information indicative of the map object property; and
cause information indicative of the filtered map interaction descriptor to be sent to a separate apparatus.

2. The apparatus of claim 1, wherein the memory includes computer program code configured to, working with the processor, cause the apparatus to perform identification of the map object based, at least in part, on the map operation.

3. The apparatus of claim 2, wherein the identification of the map object comprises determination of a correlation between the map operation and the map object.

4. The apparatus of claim 3, wherein the determination of the correlation between the map operation and the map object is based, at least in part, on one or more of a map operation heat map, a display position of at least a portion of a representation of map information, a map operation time associated with the map operation, or gaze tracking information that is indicative of the map object.

5. The apparatus of claim 1, wherein the map interaction descriptor is comprised by a map interaction session descriptor that comprises at least one other map interaction descriptor.

6. The apparatus of claim 5, wherein the determination of the filtered map interaction descriptor comprises modification of the map interaction descriptor such that at least a portion of the map interaction descriptor is generalized.

7. The apparatus of claim 5, wherein the memory includes computer program code configured to, working with the processor, cause the apparatus to perform determination that the map interaction session descriptor at least partially corresponds with at least a portion of at least one historical map interaction session descriptor, wherein the determination of the filtered map interaction descriptor comprises determination of the filtered map interaction descriptor based, at least in part, on the privacy setting, the map interaction session descriptor, and the historical map interaction session descriptor, such that the filtered map interaction descriptor at least partially corresponds with at least the portion of the historical map interaction descriptor of the historical map interaction session descriptor and another portion of the historical map interaction descriptor of the historical map interaction session descriptor.

8. The apparatus of claim 5, wherein the map interaction session descriptor comprises information indicative of a chronological sequence of the map interaction descriptor and the other map interaction descriptor, and the determination of the filtered map interaction descriptor comprises modification of the map interaction session descriptor such that the map interaction session descriptor fails to comprise the information indicative of the chronological sequence of the map interaction descriptor and the other map interaction descriptor.

9. The apparatus of claim 1, wherein the memory includes computer program code configured to, working with the processor, cause the apparatus to perform causation of display of a representation of map information on a display comprised by the apparatus, wherein the receipt of information indicative of the map operation comprises receipt of information indicative of a map operation input at a position on the display that corresponds with the representation of the map information.

10. A method comprising:
receiving information indicative of a map operation that is associated with a map object, the map operation being invoked by a user of a wireless communication device, and the map object being independent of a current location of the user;
determining, by a processor, a map interaction descriptor that comprises information indicative of the map object, information indicative of the map operation, and information indicative of at least one map object property, wherein the map interaction descriptor comprises a map interaction session descriptor that provides information from which it is determinable as to whether a particular user is uniquely identifiable;
determining, by the processor, a privacy setting that is associated with the map interaction descriptor based, at least in part, on at least a portion of the map interaction descriptor;
determining, by the processor, a filtered map interaction descriptor based, at least in part, on the privacy setting and the map interaction descriptor, such that the filtered map interaction descriptor is absent from at least a portion of at least one of the information indicative of the map object, the information indicative of the map operation, or the information indicative of the map object property; and
causing of information indicative of the filtered map interaction descriptor to be sent to a separate apparatus in order to facilitate sharing of the information.

11. The method of claim 10, further comprising identifying the map object based, at least in part, on the map operation.

12. The method of claim 11, wherein the identification of the map object comprises determination of a correlation between the map operation and the map object.

13. The method of claim 10, wherein the map interaction descriptor is comprised by a map interaction session descriptor that comprises at least one other map interaction descriptor.

14. The method of claim 13, wherein the determination of the filtered map interaction descriptor comprises modification of the map interaction descriptor such that at least a portion of the map interaction descriptor is generalized.

15. The method of claim 13, further comprising determining that the map interaction session descriptor at least partially corresponds with at least a portion of at least one historical map interaction session descriptor, wherein the determination of the filtered map interaction descriptor comprises determination of the filtered map interaction descriptor based, at least in part, on the privacy setting, the map interaction session descriptor, and the historical map interaction session descriptor, such that the filtered map interaction descriptor at least partially corresponds with at least the portion of the historical map interaction descriptor of the historical map interaction session descriptor and another portion of the historical map interaction descriptor of the historical map interaction session descriptor.

16. The method of claim 13, wherein the map interaction session descriptor comprises information indicative of a chronological sequence of the map interaction descriptor and the other map interaction descriptor, and the determination of the filtered map interaction descriptor comprises modification of the map interaction session descriptor such that the map interaction session descriptor fails to comprise the information indicative of the chronological sequence of the map interaction descriptor and the other map interaction descriptor.

17. At least one non-transitory computer-readable medium encoded with instructions that, when executed by a processor, perform:
receive information indicative of a map operation that is associated with a map object, the map operation being invoked by a user of a wireless communication device, and the map object being independent of a current location of the user;
determine a map interaction descriptor that comprises information indicative of the map object, information indicative of the map operation, and information indicative of at least one map object property, wherein the map interaction descriptor comprises a map interaction session descriptor that provides information from which it is determinable as to whether a particular user is uniquely identifiable;
determine a privacy setting that is associated with the map interaction descriptor based, at least in part, on at least a portion of the map interaction descriptor;
determine a filtered map interaction descriptor based, at least in part, on the privacy setting and the map interaction descriptor, such that the filtered map interaction descriptor is absent from at least a portion of at least one of the information indicative of the map object, the information indicative of the map operation, or the information indicative of the map object property; and cause information indicative of the filtered map interaction descriptor to be sent to a separate apparatus.

18. The non-transitory computer-readable medium of claim 17, wherein the determination of the filtered map interaction descriptor comprises modification of the map interaction descriptor such that at least a portion of the map interaction descriptor is generalized.

19. The non-transitory computer-readable medium of claim 17, wherein the map interaction descriptor is comprised by a map interaction session descriptor that comprises at least one other map interaction descriptor, and further encoded with instructions that, when executed by a processor, perform determination that the map interaction session descriptor at least partially corresponds with at least a portion of at least one historical map interaction session descriptor, wherein the determination of the filtered map interaction descriptor comprises determination of the filtered map interaction descriptor based, at least in part, on the privacy setting, the map interaction session descriptor, and the historical map interaction session descriptor, such that the filtered map interaction descriptor at least partially corresponds with at least the portion of the historical map interaction descriptor of the historical map interaction session descriptor and another portion of the historical map interaction descriptor of the historical map interaction session descriptor.

20. The non-transitory computer-readable medium of claim 17, wherein the map interaction descriptor is comprised by a map interaction session descriptor that comprises at least one other map interaction descriptor, the map interaction session descriptor comprises information indicative of a chronological sequence of the map interaction descriptor and the other map interaction descriptor, and the determination of the filtered map interaction descriptor comprises modification of the map interaction session descriptor such that the map interaction session descriptor fails to comprise the information indicative of the chronological sequence of the map interaction descriptor and the other map interaction descriptor.

* * * * *